US012680786B2

(12) United States Patent
Rossman et al.

(10) Patent No.: US 12,680,786 B2
(45) Date of Patent: Jul. 14, 2026

(54) GUIDED MUNITION WITH PASSIVE HOMING TO A GPS JAMMER

(71) Applicant: BAE Systems Information and Electronic Systems Integration Inc., Nashua, NH (US)

(72) Inventors: Court E. Rossman, Merrimack, NH (US); Paul D. Zemany, Amherst, NH (US); Jason H. Batchelder, Nashua, NH (US); Matthew F. Chrobak, Groton, MA (US); Oscar Bonilla, East Boston, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 62 days.

(21) Appl. No.: 18/978,422

(22) Filed: Dec. 12, 2024

(65) Prior Publication Data

US 2026/0168770 A1 Jun. 18, 2026

(51) Int. Cl.
*F41G 7/22* (2006.01)
*H04K 3/00* (2006.01)

(52) U.S. Cl.
CPC ......... *F41G 7/2286* (2013.01); *F41G 7/2253* (2013.01); *H04K 3/20* (2013.01)

(58) Field of Classification Search
CPC ........ F41G 7/2286; F41G 7/2253; H04K 3/20
See application file for complete search history.

(56) References Cited

U.S. PATENT DOCUMENTS

| | | | | |
|---|---|---|---|---|
| 4,108,400 A * | 8/1978 | Groutage | F41G 7/008 701/531 |
| 4,679,748 A * | 7/1987 | Blomqvist | F41G 7/2286 244/3.19 |
| 4,735,379 A * | 4/1988 | Leveque | F41G 7/2286 244/3.15 |
| 5,021,796 A * | 6/1991 | Corzine | H01Q 21/245 343/771 |
| 5,061,930 A | 10/1991 | Nathanson et al. | |

(Continued)

FOREIGN PATENT DOCUMENTS

KR 102337300 B1 12/2021

OTHER PUBLICATIONS

International Search Report, PCT/US25/58891, mailed Feb. 26, 2026, 13 pages.

*Primary Examiner* — Bernarr E Gregory
(74) *Attorney, Agent, or Firm* — Sand, Sebolt & Wernow LPA

(57) ABSTRACT

A modular radio frequency (RF) seeker may be modularly connected with a projectile having a diameter of about four inches or less. The modular RF seeker may have a plurality of RF antennas, wherein at least two RF antennas are spaced apart from each other at a distance that is less than one wavelength of a signal band of interest that is to be detected by the modular RF seeker. A modular connector that modularly connects with another portion of the projectile, wherein when modularly connected, the plurality of RF antennas are in operative communication with a guidance kit on the projectile that guides the projectile toward at least one signal jammer emitting a jamming signal at the signal band of interest.

20 Claims, 9 Drawing Sheets

(56) References Cited

U.S. PATENT DOCUMENTS

| | | | | |
|---|---|---|---|---|
| 5,064,141 | A * | 11/1991 | Nesline, Jr. | F41G 7/008 701/302 |
| 5,458,041 | A * | 10/1995 | Sun | F41G 7/2286 244/3.11 |
| 5,486,831 | A * | 1/1996 | Rowland | G01S 3/325 342/149 |
| 6,177,904 | B1 * | 1/2001 | Coenen | G01S 7/292 342/195 |
| 6,339,396 | B1 * | 1/2002 | Mayersak | G01S 19/51 342/357.34 |
| 6,806,823 | B1 * | 10/2004 | Smith | F41G 7/2286 342/13 |
| 7,271,775 | B1 | 9/2007 | Rossman et al. | |
| 7,307,575 | B2 | 12/2007 | Zemany | |
| 7,355,545 | B2 | 4/2008 | Zemany et al. | |
| 7,460,052 | B2 | 12/2008 | Zemany et al. | |
| 7,460,053 | B2 | 12/2008 | Zemany et al. | |
| 7,503,521 | B2 | 3/2009 | Maynard et al. | |
| 7,528,764 | B2 | 5/2009 | Zemany et al. | |
| 7,533,849 | B2 | 5/2009 | Zemany et al. | |
| 7,825,857 | B2 | 11/2010 | Lackey et al. | |
| 7,834,300 | B2 | 11/2010 | Zemany et al. | |
| 7,847,730 | B2 | 12/2010 | Ryba | |
| 7,852,256 | B2 | 12/2010 | Zemany | |
| 7,852,280 | B2 | 12/2010 | Zink et al. | |
| 8,089,033 | B2 | 1/2012 | Zank et al. | |
| 8,132,491 | B2 | 3/2012 | Real et al. | |
| 8,395,298 | B2 | 3/2013 | Rossman | |
| 8,446,310 | B2 * | 5/2013 | Law | H04K 3/22 342/16 |
| 8,450,668 | B2 | 5/2013 | Maynard et al. | |
| 8,587,467 | B1 | 11/2013 | Zemany | |
| 8,995,902 | B2 | 3/2015 | Reiss | |
| 9,210,384 | B2 | 12/2015 | Zemany | |
| 9,319,961 | B2 | 4/2016 | Tween et al. | |
| 9,541,364 | B2 * | 1/2017 | Facciano | F41G 7/2286 |
| 9,935,349 | B2 | 4/2018 | Johnson et al. | |
| 10,345,087 | B2 | 7/2019 | Choiniere et al. | |
| 10,473,746 | B1 | 11/2019 | Rossman et al. | |
| 10,665,961 | B1 | 5/2020 | Mcmahon et al. | |
| 10,907,936 | B2 | 2/2021 | Zemany et al. | |
| 10,942,013 | B2 | 3/2021 | Zemany et al. | |
| 10,962,990 | B2 | 3/2021 | Choiniere et al. | |
| 10,992,046 | B2 | 4/2021 | Howarth et al. | |
| 11,067,372 | B2 | 7/2021 | Schorr et al. | |
| 11,067,659 | B2 | 7/2021 | Rossman et al. | |
| 11,070,307 | B2 | 7/2021 | Schay et al. | |
| 11,168,959 | B2 | 11/2021 | Frey, Jr. et al. | |
| 11,175,115 | B2 | 11/2021 | Schorr et al. | |
| 11,287,233 | B2 | 3/2022 | Zemany et al. | |
| 11,300,670 | B2 | 4/2022 | Choiniere et al. | |
| 11,342,687 | B1 | 5/2022 | Rossman et al. | |
| 11,385,025 | B2 | 7/2022 | Choiniere et al. | |
| 11,435,165 | B2 | 9/2022 | Smith et al. | |
| 11,435,430 | B2 | 9/2022 | Dusaitis et al. | |
| 11,480,413 | B2 | 10/2022 | Schorr et al. | |
| 11,522,265 | B2 | 12/2022 | Rossman et al. | |
| 11,555,680 | B2 | 1/2023 | Zemany et al. | |
| 11,588,225 | B2 | 2/2023 | Rossman et al. | |
| 11,601,214 | B2 | 3/2023 | Zemany et al. | |
| 11,650,033 | B2 | 5/2023 | Batchelder et al. | |
| 11,698,244 | B2 | 7/2023 | Zemany et al. | |
| 11,740,055 | B1 | 8/2023 | Choiniere et al. | |
| 2002/0097184 | A1 * | 7/2002 | Mayersak | G01S 19/51 342/358 |
| 2006/0250294 | A1 | 11/2006 | Zemany et al. | |
| 2006/0284757 | A1 | 12/2006 | Zemany | |
| 2007/0024487 | A1 | 2/2007 | Zemany et al. | |
| 2007/0024488 | A1 | 2/2007 | Zemany et al. | |
| 2007/0176838 | A1 | 8/2007 | Zink et al. | |
| 2007/0205319 | A1 | 9/2007 | Maynard et al. | |
| 2007/0205320 | A1 | 9/2007 | Zemany et al. | |
| 2007/0241227 | A1 | 10/2007 | Zemany et al. | |
| 2008/0029641 | A1 | 2/2008 | Carlson et al. | |
| 2008/0074322 | A1 | 3/2008 | Ryba | |
| 2008/0111729 | A1 | 5/2008 | Zemany et al. | |
| 2008/0295677 | A1 | 12/2008 | Real et al. | |
| 2009/0033539 | A1 | 2/2009 | Zemany | |
| 2009/0039197 | A1 | 2/2009 | Maynard et al. | |
| 2009/0308970 | A1 | 12/2009 | Zank et al. | |
| 2010/0201572 | A1 | 8/2010 | Lackey et al. | |
| 2012/0175999 | A1 | 7/2012 | Rossman | |
| 2014/0038541 | A1 | 2/2014 | Reiss | |
| 2014/0078294 | A1 | 3/2014 | Zemany | |
| 2014/0226645 | A1 | 8/2014 | Tween et al. | |
| 2016/0182013 | A1 | 6/2016 | Johnson et al. | |
| 2018/0013203 | A1 | 1/2018 | Wangsvick | |
| 2018/0172794 | A1 | 6/2018 | Rossman et al. | |
| 2019/0041178 | A1 | 2/2019 | Choiniere et al. | |
| 2019/0148781 | A1 | 5/2019 | Zemany et al. | |
| 2020/0096291 | A1 | 3/2020 | Schorr et al. | |
| 2020/0161776 | A1 | 5/2020 | Mcmahon et al. | |
| 2020/0235843 | A1 | 7/2020 | Zemany et al. | |
| 2020/0274634 | A1 | 8/2020 | Schay et al. | |
| 2020/0340787 | A1 | 10/2020 | Zemany et al. | |
| 2020/0363162 | A1 | 11/2020 | Zemany et al. | |
| 2020/0395655 | A1 | 12/2020 | Howarth et al. | |
| 2020/0400412 | A1 | 12/2020 | Zemany et al. | |
| 2021/0033371 | A1 | 2/2021 | Frey, Jr. et al. | |
| 2021/0041897 | A1 | 2/2021 | Choiniere et al. | |
| 2021/0102790 | A1 | 4/2021 | Schorr et al. | |
| 2021/0116216 | A1 | 4/2021 | Schorr et al. | |
| 2021/0172717 | A1 | 6/2021 | Schorr et al. | |
| 2021/0190459 | A1 | 6/2021 | Choiniere et al. | |
| 2021/0231406 | A1 | 7/2021 | Zemany et al. | |
| 2021/0231424 | A1 | 7/2021 | Zemany et al. | |
| 2021/0231425 | A1 | 7/2021 | Zemany et al. | |
| 2021/0239430 | A1 | 8/2021 | Zemany et al. | |
| 2021/0262762 | A1 | 8/2021 | Hackel et al. | |
| 2021/0270570 | A1 | 9/2021 | Choiniere et al. | |
| 2021/0278516 | A1 | 9/2021 | Choiniere et al. | |
| 2022/0115775 | A1 | 4/2022 | Rossman et al. | |
| 2022/0178659 | A1 | 6/2022 | Smith et al. | |
| 2022/0178665 | A1 | 6/2022 | Batchelder et al. | |
| 2022/0179034 | A1 | 6/2022 | Dusaitis et al. | |
| 2022/0260340 | A1 | 8/2022 | Choiniere et al. | |
| 2022/0344793 | A1 | 10/2022 | Rossman et al. | |
| 2022/0344970 | A1 | 10/2022 | Affleck et al. | |

* cited by examiner

GUIDED MUNITION WITH PASSIVE HOMING TO A GPS JAMMER

TECHNICAL FIELD

The present disclosure relates generally to guided munitions or guided projectiles.

BACKGROUND ART

Many types of radio frequency (RF) sensors or devices are used on guided projectiles or missiles. One exemplary RF device is a Global Positioning System (GPS) is used on warheads and drones for accurate navigation and targeting. GPS-guided warheads, often known as precision-guided munitions (PGMs), use GPS signals to determine their precise location and velocity, or to determine the location of a target. These warheads or munitions are equipped with GPS receivers that continuously receive signals from multiple GPS satellites orbiting the Earth. By calculating the time it takes for the signals to reach the warhead or munition, the GPS receiver can determine its distance from each satellite. Through a process called trilateration, the warhead or munition's exact position can be pinpointed based on the intersections of these distances. This information is used to adjust the trajectory of the warhead, ensuring it reaches its intended target with high accuracy.

Drones utilize GPS technology for both navigation and guidance. A drone's onboard GPS receiver receives signals from multiple GPS satellites, allowing the drone's flight control system to determine its precise location and altitude. This information is relevant for maintaining stable flight and executing autonomous navigation. For guidance, drones can use GPS waypoints or coordinates to follow a predetermined path or reach specific targets. By programming a series of waypoints, the drone's onboard computer can calculate the necessary adjustments to its flight controls to stay on course. Drones can also use real-time GPS data to make in-flight adjustments, compensate for external factors like wind, and accurately reach their designated destinations.

When RF devices are used, they may be susceptible to jamming. Signal jammers, such as GPS jammers, are small electronic devices designed to disrupt the reception of RF signals, namely GPS, signals by emitting radiofrequency interference in the same frequency range used by GPS satellites. They can be relatively small and inexpensive to produce and deploy. GPS jammers are typically compact devices that can be easily transported and concealed. They can range in size from handheld devices to larger, more powerful models. Further, advances in technology have made the components necessary to build GPS jammers relatively affordable. This has contributed to their accessibility and use by various entities. GPS jammers can be deployed in different ways, such as being placed on vehicles, carried by personnel, or integrated into other equipment. Some jammers are designed to be portable, allowing them to be quickly set up in various locations.

When activated, GPS jammers emit signals on the same frequencies used by GPS satellites. These signals create noise and interference, disrupting the accurate reception of GPS signals by GPS receivers on warheads, munitions, drones, or other devices. When a GPS-guided warhead, munition or drone encounters the interference from a jammer, its GPS receiver can struggle to accurately calculate its position. This can result in navigation errors, targeting inaccuracies, and loss of precise control.

Some exemplary GPS jammers can generate white noise or be a repeater. A white noise jammer signal needs to be much higher power than the true satellite GPS signals. A repeater jammer may be, but is not required to be, much higher signal in strength in order to dominate the processing in GPS receivers. A repeater jammer individual signal can be resolved because it is using the same known modulation as GPS systems, not white noise.

Current anti-radiation missiles (ARM) are in existence that can be used to disable a RF signal jammer, such as the aforementioned GPS signal jammers. designed to detect and home in on an enemy radio emission source. Typically, these ARM devices are designed for use against enemy signal jammers, enemy radar, or enemy radios.

Currently, these ARM devices are successfully able to disable enemy signal jammers because they are equipped with antennas that are spaced more than one wavelength apart than the signal band of interest. They are able to place these antennas more than one wavelength apart because the ARM devices are relatively large and have enough space or "real estate" to place the respective antenna patches sufficiently apart.

However, in the ever changing military theater of operation, some missiles are becoming smaller and smaller, which also makes them significantly less expensive than the current larger ARM devices. For example, modern modular missiles have a maximum diameter. In some missiles, the diameter is eight inches and in others the diameter is about four inches or less. These modular missiles cost significantly less than the larger ARM devices. Due to the small size of these new modern missiles, it is difficult to enable these smaller and/or modular missiles to home towards an enemy signal jammer or other RF emitter because antennas cannot be spaced far enough apart to perform accurate direction finding to guide these missiles toward their intended target.

SUMMARY OF THE INVENTION

What is needed is a device that disables an RF device, such as an RF signal jammer, for use with or on the new smaller modular missiles. This is advantageous because the new smaller modular missiles are significantly less expensive than the previous ARM devices. This device can be carried by a smaller (i.e., having a diameter of about four inches or less) PGM, GPS-guided munition, warhead, drone or another GPS-guided device. In these smaller missiles or devices, RF antennas are spaced less than one wavelength apart relative to the waveband of the signal of interest. Stated otherwise, the present disclosure provides a seeker that enables a sub-wavelength aperture or baseline, which typically is defined by the diameter of the projectile or missile. Further, inasmuch as GPS-guided devices are very expensive and GPS signal jammers are inexpensive, what is needed is a low-cost device that disables the RF emitter, such as GPS jammer, so that the GPS-guided device can accomplish its mission.

The present disclosure addresses this need and other needs by providing, in one exemplary embodiment, a fire-and-forget, modular RF antenna seeker, such as a GPS seeker, which is configured to disable an RF emitter, such as GPS signal jammer. This fire-and-forget system is a passive type of missile/munition guidance system or assembly which does not require further external intervention after launch such as illumination of the target or wire guidance, and can hit its target without the launcher being in line-of-sight of the target. This is an advantageous for a guided weapon to have, since a person or vehicle that lingers near the target to guide the missile (using, for instance, a laser designator) is vulnerable to attack and unable to carry out other tasks. For the example of a GPS signal jammer at an 8 inch RF wavelength, the projectile can be less than 8 inches in diameter and yet still get good angle resolution using cross correlation of the continuous wave (CW) signal over time. This example scales to the frequency band of interest, so it is not constrained to an 8 inch diameter projectile or a 4 inch diameter projectile.

The RF or GPS seeker of various embodiments of the present disclosure may be a low cost, small form factor component that has RF antennas are spaced less than one wavelength apart relative to the waveband of the signal of interest yet enables cross correlation and enables multiple signal classification (MUSIC) resolution that is configured disable one or multiple RF or GPS signal jammer sources. The RF or GPS seeker of various embodiment of the present disclosure may also provide custom roll trajectory, and various antenna designs and antenna layouts.

The RF or GPS seeker of various embodiments of the present disclosure may use the RF or GPS jammer signal for passive homing to disable the jammer. The one or more RF or GPS jammer signals behave as a beacon. The jammer can be located inside buildings such that the jammer is not physically visible, which is not an issue for passive homing, such as passive RF homing. Thus, passive RF homing can be fire-and-forget. Other embodiments could use active homing, if desired. However, active homing, such as IR homing or laser guidance is not an option for jammers that are inside buildings, or that are too small for an optical sensor at a distance to resolve. Thus, the embodiments of the present disclosure largely focus on passive homing, although active homing is possible when the RF or GPS jammer can be seen.

In one exemplary embodiment, the RF or GPS seeker may be a modular part of an Advanced Precision Kill Weapon System (APKWS) missile or other guided munition, which may be used to disable RF or GPS jammers. In this embodiment or other embodiments, the GPS or RF seeker can be screwed into or otherwise connected, via a modular connection (e.g., corresponding mating threads), to the modular APKWS to enable the mission. Previous APKWS missiles or guided munitions do not have a GPS seeker for fire and forget. The present disclosure should enable the APKWS missile or other guided munition to be used for a new function, in addition to the current laser guidance. The APKWS missile or guided munition is already designed to be modular and low cost having a screw-in guidance system and screw-in solid fuel engine. Thus, the RF or GPS seeker of the present disclosure can be a low-cost, modular addition to a APKWS missile or guided munition configured to screw into or otherwise attached to the APKWS missile or guided munition.

In one aspect, an exemplary embodiment of the present disclosure may provide a modular RF seeker for selective connection with a projectile having a diameter of about four inches or less, the modular RF seeker comprising: a plurality of RF antennas, wherein at least two RF antennas are spaced apart from each other at a distance that is less than one wavelength of a signal band of interest that is to be detected by the modular RF seeker; and a modular connector that modularly connects with another portion of the projectile, wherein when modularly connected, the plurality of RF antennas are in operative communication with a guidance kit on the projectile that guides the projectile toward at least one signal jammer emitting a jamming signal at the signal band of interest. In this exemplary embodiment or another embodiment, the guidance kit may include command and control logic to cross correlate data received from the RF seeker to obtain relative phase and amplitude of the jamming signal and direction finding a location of the at least one signal jammer based on a relative phase and amplitude of the jamming signal.

In one aspect, an exemplary embodiment of the present disclosure may provide a guided munition comprising: a modular first portion located at a front end of a guided munition, wherein the modular first portion is a warhead; a modular second portion located rearward of the modular first portion, wherein the modular second portion selectively connects with the modular first portion, wherein the modular second portion is a guidance section; a modular third portion located rearward of the modular second portion, wherein the modular third portion selectively connects with the modular second portion, wherein the modular third portion is a rocket motor; a seeker that receives a jamming signal from a RF or GPS signal jammer; and command and control logic that receives data from the seeker based on the jamming signal received, and the command and control logic guides the guided munition to the GPS signal jammer, wherein the guided munition is configured to detonate near the GPS signal jammer and thereby disable the RF or GPS signal jammer. In this exemplary embodiment or another exemplary embodiment, the seeker may be located on one of the modular first portion and the modular second portion. This exemplary embodiment or another exemplary embodiment may include an exterior surface of the modular first portion, wherein the seeker is positioned internally within the modular first portion. This exemplary embodiment or another exemplary embodiment may include a canard of the modular second portion, wherein the seeker is positioned on the canard. This exemplary embodiment or another exemplary embodiment may include a plurality of dual polarization antennas located on one of the modular first portion and the modular second portion. This exemplary embodiment or another exemplary embodiment may include a plurality of linear patch antennas located on one of the modular first portion and the modular second portion. This exemplary embodiment or another exemplary embodiment may provide that the command and control logic cross correlates data from the seeker to obtain relative phase and amplitude of the jammer signal. This exemplary embodiment or another exemplary embodiment may provide that the command and control logic direction finds a location of the RF or GPS signal jammer based on the relative phase and amplitude of the jammer signal. This exemplary embodiment or another exemplary embodiment may provide include a look up table, wherein the command and control logic direction finds a location of the RF or GPS signal jammer based on relative phase and amplitudes contained in the lookup table. This exemplary embodiment or another exemplary embodiment may provide that the command and control logic is provided with a roll, pitch, and yaw of the guided munition, and the command and control logic instructs the guided munition to move and position the roll at an orientation such that all antennas that compose the seeker receive at least some of the jammer signal and none of the antennas are in an exact cross polarization relative to each other.

In yet another aspect, an exemplary embodiment of the present disclosure may provide a computer program product including one or more non-transitory machine-readable mediums encoded with instructions that when executed by one or more processors cause a process to be carried out for, the process comprising: receiving, at a seeker on a guided munition, a jamming signal emanating from a global positioning signal (GPS) jammer located at or near a point of interest (POI), wherein the guided munition is composed of multiple modular portions; altering a trajectory of the guided munition in response to receiving the jamming signal; directing the trajectory of the guided munition toward the GPS jammer; and destroying one of the GPS jammer and another object at the point of interest with the guided munition. This exemplary embodiment or another exemplary embodiment may provide receiving the jamming signal at the seeker when the seeker is located on one of a modular first portion and a modular second portion of the guided munition. This exemplary embodiment or another exemplary embodiment may provide receiving the jamming signal at the seeker when the seeker is located on an exterior surface of a modular first portion of the guided munition, wherein the seeker is positioned internally within the modular first portion. This exemplary embodiment or another exemplary embodiment may provide receiving the jamming signal at the seeker when the seeker is located on a canard of a modular second portion of the guided munition; and moving the canard to alter the trajectory of the guided munition. This exemplary embodiment or another exemplary embodiment may provide receiving the jamming signal at the seeker composed of a plurality of dual polarization antennas located on one of a modular first portion and a modular second portion of the guided munition. This exemplary embodiment or another exemplary embodiment may provide receiving the jamming signal at the seeker composed of a plurality of linear patch antennas located on one of a modular first portion and a modular second portion on the guided munition. This exemplary embodiment or another exemplary embodiment may provide correlating data from the seeker to obtain relative phase and amplitude of the jamming signal. This exemplary embodiment or another exemplary embodiment may provide direction finding to the location of the GPS signal jammer based on the relative phase and amplitude of the jamming signal. This exemplary embodiment or another exemplary embodiment may provide comparing the relative phase and amplitude of the jamming signal to values in a look up table, wherein command and control logic direction finds a location of the GPS signal jammer based on relative phase and amplitudes contained in the lookup table. This exemplary embodiment or another exemplary embodiment may provide moving and positioning the roll at an orientation such that all antennas that compose the seeker receive at least some of the jamming signal and none of the antennas are in an exact cross polarization relative to each other.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

A system 10 or assembly for disabling any type of RF signal jammer, such as a GPS jammer, is provided herein. The system or assembly can utilize various configurations to perform homing or location functions to disable any type of RF signal jammer, an example of which is shown and referred to as GPS jammer 50A. Thus, it is to be understood that although the examples discussed herein refer to GPS signals, this term includes any signal within the RF frequency waveband. Some particular embodiments perform passive RF homing to disable the GPS jammer. The passive RF homing may have a very large processing gain, and thus, some embodiments only have 1 degree phase error per channel. The system 10 can be carried by any type of platform that is susceptible to having its GPS components being disabled by a GPS jammer 50A. Although the examples utilized herein are shown with reference to a projectile 2, it is to be understood that this technology is applicable for any platform or moveable item (e.g. munition, drone, aircraft etc.) regardless of whether it is manned or unmanned and regardless of whether the moveable item is land-based, sea-based, air-based or space-based.

Figure 1A:
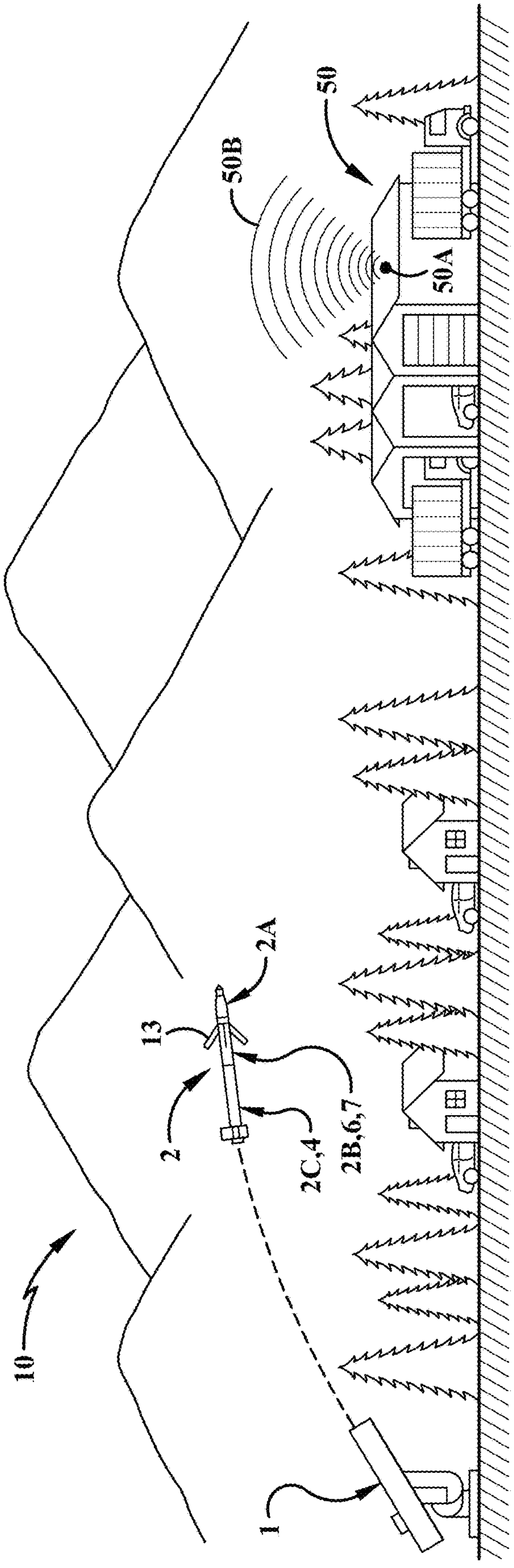
FIG. 1A (FIG. 1A) is a diagrammatic view of an exemplary guided munition launched from a ground-based launcher toward a GPS jammer transmitting a jamming signal.

FIG. 1A illustrates an environment in which a launcher or a launch vehicle 1, generally referred herein as launch vehicle, launching a projectile 2 or a guided rocket/munition, generally referred herein as a projectile, towards a point of interest (POI) 50 for suppression operations or elimination of the building or structure. That building or structure may include a GPS jammer 50A that an adversary uses to jam or disrupt signals. In one particular embodiment, at the POI 50, the GPS signal jammer 50A radiates a jamming signal 50B. The jamming signal 50B may be any signal in the RF waveband frequency.

In one embodiment, launch vehicle 1 is a ground launch vehicle that is operably engaged with a ground surface and is configured to launch surface-to-surface projectiles 2 or missiles (or "SSM") or ground-to-ground projectiles or missiles (or "GGM"). In other words, the illustrated launch vehicle 1 is capable of launching projectiles and other similar devices from land and striking targets on land or sea. It will be understood that the illustrated launch vehicle 1 is exemplary only and any type of launch vehicle is contemplated to be represented by the illustrated device. In one exemplary embodiment, the launch vehicle 1 may be represented as hand-held launcher, a launcher fixed to a ground transporting vehicle, a launcher fixed to a naval vehicle, or other suitable launchers for launching projectiles and other similar devices from land or sea and striking targets on land or sea.

Figure 1B:
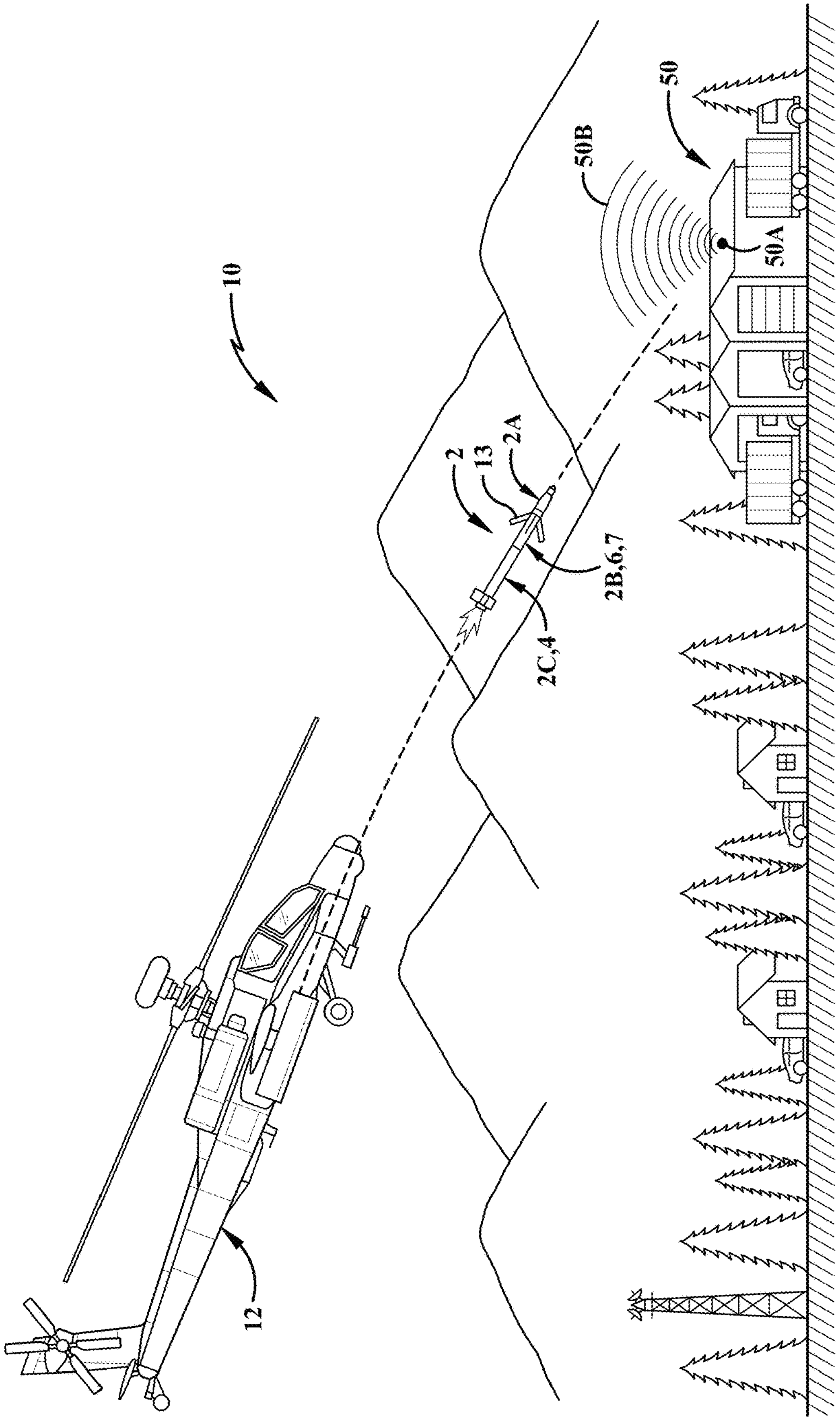
FIG. 1B (FIG. 1B) is a diagrammatic view of an exemplary guided munition launched from an aerial-based launcher toward a GPS jammer transmitting a jamming signal.

FIG. 1B depicts another exemplary environment in which the projectile 2 is a precision guided munition, which may also be referred to as PGM 2. The PGM 2 is carried by a platform 12, which may also be referred to as aerial vehicle 12 such as a helicopter, airplane or drone. When platform 12 is embodied as an aerial vehicle, it may be either manned or unmanned. Alternatively, aerial vehicle 12 may be a jet aircraft. Platform 12 is configured to launch or fire the PGM 2 towards the POI 50 along a trajectory.

Regardless of where the projectile 2 is launched, the projectile 2 should be equipped with a guidance kit 6 that has command and control logic for guiding the illustrated projectile 2 to a specific target, such as the GPS jammer 50A at POI 50. As provided herein, the illustrated projectile 2 is a Hydra 70 rocket equipped with a jamming signal seeker guidance kit (which may entirely form or be a part of the guidance kit 6) for guiding the illustrated projectile 2 to the POI 50, namely the GPS signal jammer 50A.

Figure 2:
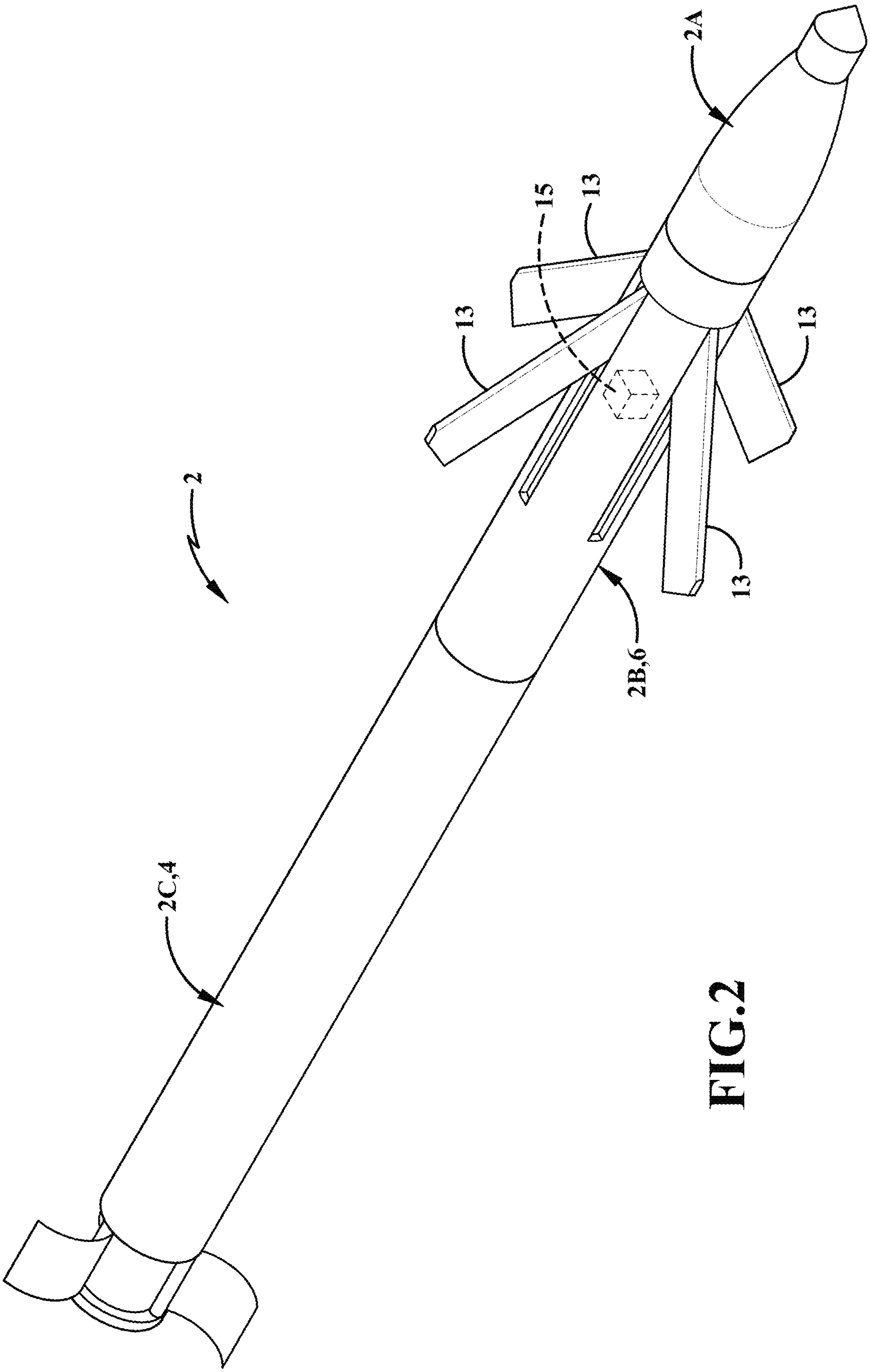
FIG. 2 (FIG. 2) is a perspective view of the exemplary guided munition that is configured to home toward the GPS jammer.

FIG. 2 depicts that the projectile may include a modular first portion 2A located at a front end of a guided munition or projectile 2, a modular second portion 2B located near or at the middle of projectile 2 and rearward of the modular first portion 2A, wherein the modular second portion 2B may selectively connect, via a modular connector or screw-in connection, with the modular first portion 2A, and a modular third portion 2C located rearward of the modular second portion 2B. Guidance kit 6 may be on any modular portion of the projectile 2 depending on the application specific needs, constraints, and physical requirements of a particular mission to disable the signal jammer 50A.

The projectile 2 includes a rocket motor or engine 4 configured to provide suitable propulsion and thrust needed for a desired operation. The rocket motor 4 includes a first end, a second end opposite to the first end, and a longitudinal axis defined therebetween. The rocket motor 4 also includes a circumferential wall that extends between the first end and the second end along the longitudinal axis of the rocket motor 4. The circumferential wall of the rocket motor 4 also defines a chamber that extends between the first end and the second end. While not illustrated herein, suitable rocket propellants and elements are stored inside of the chamber that generate propulsion and thrust for the rocket motor 4. The rocket motor 4 may include an aft fin member operably engaged with the circumferential wall proximate to the first end of the rocket motor 4. The aft fin member may provide flight assistance to the projectile 2 at the first end of the rocket motor 4 as the projectile 2 travels through the air between the initial launch at the launch vehicle 1 and a targeted POI 50, such as the GPS jammer 50A. In the illustrated embodiment, the rocket motor 4 of the projectile 2 is a standard 2.75-inch rocket motor (e.g., liquid-fueled rocket motors, solid-fueled rocket motors, or other suitable rocket motors of the like). In other exemplary embodiments, any suitable rocket motor may be equipped for a projectile based on the mission and/or objective.

The projectile 2 also includes the jammer signal guidance kit 6 that is configured to guide the projectile 2 to a specific target, namely the signal jammer 50A. The jammer signal guidance kit 6 may include a seeker or seeker hardware that implement one or more methods configured to initiate and/or deploy on-board devices to guide and/or direct the projectile 2 to a specific target, namely the POI 50 or the signal jammer 50A. The jammer signal guidance kit 6 is also configured to operably connect with a rocket motor, such as rocket motor 4, to enable guidance capabilities to the rocket motor. In one particular embodiment, the jammer signal guidance kit 6 provided with the projectile 2 is logic that detects signals 50B, such as an RF signal, to guide projectile 2 toward POI 50 or the signal jammer 50A. In an alternative exemplary embodiment, the jammer signal guidance kit 6 provided with the projectile 2 could be a legacy laser guidance kit and/or apparatus. In one example, a legacy guidance kit described and illustrated herein may be an APKWS laser guidance kit manufactured by BAE Systems. In another example, a legacy guidance kit described and illustrated herein may be a preexisting or legacy laser guidance kit. It should be understood that any devices, components, and/or systems described herein that forms the guidance kit 6 described herein are provided in the laser-guidance kit.

In one particular embodiment, the modular second portion 2B includes a guidance section that includes the jammer signal guidance kit 6. A seeker 7 is in operative communication with the jammer signal guidance kit 6 and receives the jamming signal 50B from the signal jammer 50A. The modular third portion 2C may be the rocket motor 4. The seeker 7 may be modularly connected via the modular connection (e.g., a screw-in connection) with either the first portion 2A or the second portion 2B.

The jammer signal guidance kit 6 may include command and control logic that receives data from the seeker 7 based on the jamming signal 50B received, and the command and control logic guides the guided munition or projectile 2 to the signal jammer 50A, wherein the guided munition or projectile 2 is configured to detonate near the signal jammer 50A and thereby disable the signal jammer 50A. In another example, the seeker 7 may be carried by or located on the modular first portion 2A.

The modular second portion 2B includes a body that operably engages with the rocket motor 4 or modular third portion 2C. The body includes a first end that operably engages with the rocket motor 4 at the second end of the rocket motor 4, a second end opposite to the first end, and a longitudinal axis defined therebetween. The body also includes a circumferential wall that extends between the first end and the second end of the modular second portion 2B. The circumferential wall of the body also defines a chamber that extends between the first end and the second end. There are devices and components operably engaged with the body that are positioned inside of the chamber.

Modular second portion 2B may also optionally include a set of retractable flaperons, canards, or wings 13 operably engaged with the body of the modular second portion 2B. Each retractable wing of the set of retractable wings 13 is moveable on the body. During operation, the set of retractable wings 13 pivot outwardly from the body when the projectile 2 is launched and travels through the air. Additionally, each retractable wing of the set of retractable wings 13 may also define a cavity.

At least one processor or microprocessor 15 is housed inside of the modular second portion 2B. Alternatively, the processor 15 may be located in either the first portion 2A or the third portion 2C. In the illustrated embodiment, a single processor 15 is illustrated herein for schematic purposes. In other exemplary embodiments, any suitable number of processors may be provided with a projectile for specific a military operation (e.g., guidance protocols and methods). The processor 15 is configured to logically perform protocols and/or methods that are provided on the processor 15 during or prior to military operation. The processor 15 may also be powered by an on-board power source and/or power supply (e.g., portable battery, etc.) in order to logically perform protocols and/or methods that are operatively in communication with the processor 15.

With respect to the GPS jammer 50A that generates the GPS jamming signal 50B, the jammers are relatively inexpensive. GPS jamming is a risk for GPS-guided missiles or munitions, such as projectile 2 or PGM 2. Many other systems, such as projectiles, bombs, drones, and/or vehicles (regardless of whether manned or unmanned), rely on GPS. Jamming systems or jammers, such as GPS jammer 50A, can produce signals of any polarization, such as via a vertical polarization antenna or a co-polarization (CoPol) antenna. For a ground based jammer 50A, it would typically be vertical polarization because the CoPol antennas for projectiles or unmanned aerial vehicles (UAVs) are communicating with signals from satellites and are designed for CoPol in those directions. Due to ground plane effects on the platform 12, the polarization along the horizon would typically be a corrupted vertical polarization. Jamming signals, such as signal 50B, may have significantly stronger power than the satellite signals needed for GPS.

The jamming signal 50B is often either noise or a repeater. If a jamming signal 50B is noise, the noise will be much higher than the GPS satellite signal in order to overcome the processing gain. The GPS processing gain is ordinarily enough to achieve at least 13 dB signal-to-noise ratio (SNR). Since the GPS bandwidth is about 1 MHz and the integration time is about 0.1 seconds, the processing gain is 10^5, or 50 dB. Most jamming signals will be about 40 dB above the GPS satellite raw signal. Hence jamming signals will have about 60 dB SNR after the processing gain of cross correlation, which is a noise voltage factor of about 0.001. The phase noise from this 60 dB SNR is about 0.001*57 deg/rad or about (~) 0.1 degrees. With each channel, there may be cross correlation with a reference channel, producing a cross correlation versus time trace. The thumbtack peak of this track will be 1 sample, or 1 us, wide, and will have a phase noise of ~0.1 degrees. The commercial GPS band has about 1 MHz of bandwidth. The military GPS P-band has about 15 MHz bandwidth (e.g., the GPS L1 frequency band is about 1575.42 MHz with a bandwidth of 15.345 MHz, the GPS L2 frequency band is about 1227.6 MHz with a bandwidth of 11 MHz, and the GPS L4 frequency band is about 1176.45 MHz with a bandwidth of 12.5 MHz). Regardless of whether the commercial GPS band or the military GPS P-band, after processing gain of time*bandwidth, the SNR needs to be above 13 dB.

Jammers are typically relatively easy to home in on when the receiving antennas are spaced far apart since (i.e., greater than the wavelength of interest) and the jamming signal 50B, as detailed above, is large. The polarization of the jamming signal 50B is usually consistent measurement-to-measurement. Further, GPS or RF jammers 50A are typically continuous waves which the signal 50B to be detected and homed toward. For jammers that perform white noise jamming or perform repeating, the transmit power of the jammer is very large. In one exemplary operational embodiment, the thermal noise at 1 MHz is kTB=−173 dBm. With 50 dB processing gain, a GPS signal can be about 30 dB below the thermal noise, or −203 dBm. In this embodiment, a white noise jammer would likely produce at least −80 dBmW power at the receiver. The bandwidth is low, for example less than 30 MHz. Modern FPGAs with GHz processing speeds can perform cross correlation on 8 or 16 channels.

Newer smaller diameter projectiles 2, such as an APKWS, have physical constraints, such as that the diameter of the projectile is electrically small compared to a wavelength at GPS or another RF frequency. A typical RF wavelength is about 8 inches long, and the diameter of projectile 2 is about 2.75 inches or about 4 inches. Based on these physical constraints, the jamming tracker guidance kit 6 of the present disclosure can be operated such that the jammer signal 50B may be cross correlated for about 100 msec. This larger time (about 100 msec) is multiplied with the bandwidth processing gain, which may result in a phase error that is 1 degree phase or smaller.

Regarding direction finding (DF) accuracy based on baseline and phase noise, a free space phase estimate of the DF bearing accuracy can be performed. Smaller phase errors will yield smaller bearing errors. In one exemplary operational embodiment, the jamming signal 50B can be integrated for 0.1 seconds, for 50 dB or more of processing gain. With this exemplary integration, a phase error relative to other receive (Rx) antenna channels of a small 1 degree phase error or better is expected. This phase error corresponds to 0.5 degree bearing root mean square (RMS) errors. In some exemplary embodiments, DF systems of the present disclosure can perform signal cancellation, using MUSIC and a small DF array. Then, the DF systems may create a null in the direction of the jammer using space-time adaptive processing (STAP). Creating a null is equivalent to knowing the direction of the jammer direction.

Regarding homing, it is desirable (although not required) to obtain better than 3 degree bearing accuracy for homing to result in better than a 3 meter homing distance, with at least 20 Hz update rate. Homing using a ProNav algorithm may rely on the derivative of the angle rate. In some exemplary operations, bias angles may not be directly involved in the navigation decisions. In one example, if there is a 5 degree phase offset in any receiver channel, that will create a DF bias but should not greatly impact the angle derivative. The jammer 50A track can be established, for example using a Kalman Filter, and the angle rate from the track can update the ProNav guidance. The track can then estimate latitude (lat), longitude (long), and/or altitude.

Regarding the jamming tracker guidance kit 6, one example may include a Kalman Filter and/or ProNav algorithm or technique. The tracker kit 6 (e.g., a Kalman Filter or other technique) with an estimated range function may be a smoothing function for input to the ProNav homing algorithm. In some embodiments, the tracker guidance kit 6 can be a Kalman Filter or simply an average latitude/longitude intercept on the ground. In one embodiment, only azimuth (az) and elevation (el) updates are given to the tracker guidance kit 6 or its Kalman Filter. The track of az/el values are then provided to the ProNav homing algorithm.

The present disclosure may utilize a RF seeker 7 to ultimately guide projectile 2 to disable a jamming signal 50B from a remote signal jammer 50A. Some embodiments of the RF seeker 7 may be a passive GPS seeker. The passive GPS seeker is a technology used in various applications, primarily in military and defense systems, to determine the location of a target or object without actively emitting any signals or communicating with the GPS satellites. Instead of sending out signals to the GPS satellites to receive position data, a passive GPS seeker relies on analyzing the signals emitted by the GPS satellites that are already present in the environment.

The passive GPS seeker 7 receives the jamming signal 50B that contains timing and positional information. The passive GPS seeker 7 collects the signals 50B from one or multiple GPS jammers. By analyzing the signals' time of arrival and their slight variations due to factors like the Earth's atmosphere and the target's or jammer's motion the seeker can calculate the target's or jammer's position. The passive GPS seeker 7 uses triangulation. By comparing the time differences between the signals from different jammer's or from one jammer relative to multiple antennas, the seeker 7 can determine the target's or jammer's 50A location where the signals intersect. Using advanced algorithms and protocols, such as MUSIC and PI-CIDF, the passive GPS seeker 7 computes the target's or jammer's 50A position based on the signals' time differences and the known positions of the projectile 2 to which the passive GPS seeker 7 is mounted.

The passive GPS seeker 7 may include at least some of the following components that work together to receive, analyze, and compute the target or jammer 50A position using signals 50B from the GPS jammer 50A. While specific implementations can vary based on the application and technology level, some of the following hardware components may exist in the passive GPS seeker 7. In some embodiments, seeker 7 includes an antenna array that may be used to receive signals 50B from GPS jammer 50A. The antenna array may comprise multiple antennas that are strategically positioned on projectile 2 to capture signals from different directions. For example, a typical RF wavelength is about 8 inches long, and the diameter of projectile 2 is about 2.75 inches or about 4 inches. Due to the space constraints of the projectile 2, two of the antenna elements may be spaced apart from each other by a distance that is less than one wavelength of the signal 50B waveband of interest. In this example, the wavelength of interest is about 8 inches long and there are two antenna elements that are spaced apart from each other at a distance of about 4 inches or less. The array design or configuration of the antenna elements helps to determine the direction from which the signals 50B are arriving, aiding in triangulation. A receiver, which is part of guidance kit 6, processes the signals received by the antenna array. The receiver amplifies and filters the signals 50B to extract the necessary data, such as timing information, jammer IDs, and signal strengths. Some receivers may be designed to handle jammer signals 50B and mitigate interference. A time measurement unit may provide accurate timing for a triangulation process. The time measurement unit measures the time of arrival of signals from one jammer 50A or different jammers. It helps calculate the time differences necessary for determining the target's or jammer's position. An inertial-measurement-unit (IMU) is often integrated into the system 10, usually on projectile 2, to provide information about the seeker's 7 own motion and orientation. This data helps compensate for the seeker's 7 movements, the Earth's rotation, and other factors that could affect the accuracy of position calculations. Processor 15 or a computer performs the triangulation calculations required to determine the target's or jammer's 50A position. It processes the time differences between the signals 50B, applies mathematical algorithms, and computes the target's or jammer's 50A coordinates using triangulation techniques. The system 10 may have memory to store historical data, jammer information, and computational results. This can aid in real-time and post-mission analysis. As with any electronic system, a power supply should provide the necessary energy for all the components to function. Power efficiency is necessary to ensure the seeker's operational duration. Depending on the application, the passive GPS seeker 7 might include communication interfaces to exchange data with other systems, such as command and control units or guidance systems for munitions. The hardware components may be enclosed within a protective housing that shields or protects the sensitive electronics from environmental factors, including temperature variations, moisture, and physical damage. Given that electronic components can generate heat during operation, a cooling system might be incorporated to maintain optimal operating temperatures and prevent overheating. Depending on the specific application, additional sensors such as altimeters, barometers, or magnetometers might be integrated to provide more accurate positioning and environmental data.

Regardless of which type of RF seeker 7 is utilized, as identified in the embodiments described herein provide, the projectile 2 results in a fire-and-forget projectile with a modular seeker having a low cost and small form factor. When the signal 50B is received at the seeker 7, cross correlation and/or multiple signal classification (MUSIC) resolution of multiple jammer sources is performed by guidance kit 6 to direct or guide the projectile toward the signal jammer 50A. The guidance kit can also apply custom roll trajectory of the projectile 2.

The GPS seeker of various embodiments of the present disclosure may use the GPS jammer signal 50B for passive homing to disable the jammer 50A. In this regard, the GPS jammer signal 50B behaves as a beacon. The jammer 50B can be located inside buildings such that the jammer is not physically visible, which is not an issue for passive homing, such as passive radio frequency (RF) homing. Thus, passive RF homing can be fire-and-forget. Other embodiments could use active homing, if desired. However, active homing, such as IR homing or laser guidance is not an option for jammers that are inside buildings, or that are too small for an optical sensor at a distance to resolve. Thus, the embodiments of the present disclosure largely focus on passive homing, although active homing is possible when the GPS jammer can be seen.

In each of the embodiments detailed herein, regardless of the RF seeker 7 placement or disposition, the projectile 2 can be rolled to determine the polarization of the signal 50B, as well as utilize amplitude information of signal 50B for detection. In the exemplary embodiment in which a linear polarization transmission signal is detected or exploited, the roll should be positioned so that all antennas receive some signal, and none are in the exact same cross polarization. Then, a calibration look up table can be utilized to identify a signal rotated to the incident polarization, once the incident polarization is determined. For DF antenna arrays, configured as a seeker on projectile 2, which have a different bias angle depending on roll, the projectile should retain the same roll angle during the homing trajectory.

Correlation Interferometer Direction Finding (CIDF) is a technique that can be used in electronic warfare and signal intelligence to determine the direction of arrival (DOA) of radio frequency signals, such as signal 50B. It can be applied in various scenarios, including for when signal 50B is generated by a continuous phase (CP) jammer and for signals with arbitrary polarizations. Exemplary usage of CIDF can include direction finding in which multiple antennas or antenna elements receive signal 50B. By measuring the time or phase differences between the signals 50B received at these different antennas, CIDF can determine the direction from which the signal 50B is arriving. When interacting with a CP jammer 50A, kit 6 should track the jamming signal's 50B phase accurately. CIDF can be used to track the phase of the jamming signal 50B by comparing the received signals at different antennas (exemplary embodiments of which are shown herein at FIG. 2-FIG. 8). By using CIDF, the direction of the CP jamming signal 50B can be determined. This information can be used to assess the threat's location and take countermeasures, such as steering projectile 2 toward jammer 50A to detonate near and eliminate the jammer 50A. Regarding arbitrary polarizations, CIDF can be implemented with multiple antennas that have different polarization characteristics. This allows the system to receive signals with arbitrary polarizations effectively. By measuring the phase or time differences between the signals received at these differently polarized antennas, CIDF can determine the direction of arrival of signals with arbitrary polarizations. Projectile 2 can also use adaptive algorithms that can dynamically adjust their reception and processing to handle signals with changing or arbitrary polarizations.

In another example, the command and control logic in the guidance kit 6 may perform polarization independent (PI) direction finding using a PI-CIDF algorithm. In another example, the command and control logic in the guidance kit 6 may perform PI direction finding using MUSIC and PI-CIDF. Using a multitude of antennas (e.g., any of the embodiments detailed herein at FIG. 2-FIG. 8) can resolve the polarization of the one or more jammers 50A. For example, jamming systems can be any polarization, such as a vertical polarization antenna, or a CP polarization antenna. For a ground based jammer, it would typically be vertical polarization because the CP antennas for projectiles or UAVs are listening to signals from satellites and are designed for CP in those directions. Due to ground plane effects on the UAV, the polarization along the horizon would typically be a corrupted vertical polarization.

The guidance kit 6 determines the attitude (roll, pitch, and yaw) of projectile 2 using the antennas of RF seeker 7 that are placed along its body. RF antennas are placed at specific locations along the missile's body (exemplary embodiments of which are shown herein at FIG. 2-FIG. 8), typically at known and fixed positions. These antennas receive signals 50B from jammer 50A. The antennas should be spaced apart along the missile body to provide sufficient spatial separation for accurate attitude determination. Ideally, antennas would be placed between 1 to 5 meters apart, depending on the missile's size and design. However, this is not always possible given the space constraints of the projectile 2 (e.g., some missiles only have a diameter of about 2.75 or 3 inches). Additionally, the bandwidth is very small (e.g., a few MHz, corresponding to sample rates of a few MHz which does not enable time of arrival TOA). Instead, embodiments of the present disclosure use phase differences. The MUSIC protocol and/or PI-CIDF protocol exploit the relatively small baseline DF array to use the phase of signal 50B to determine direction for multiple simultaneous CW jammer signals 50B with independent modulation waveforms.

In some embodiments, each antenna receives signal 50B which contains information about the jammer's 50A position and time of transmission. The time delay between when signal 50B was transmitted by jammer 50A and when it is received by an antenna is called the "time of arrival" (TOA). By comparing the TOA of signals 50B received by different antennas, to the guidance kit may triangulate the missile's position in three-dimensional space relative to jammer 50A. This is based on the time it takes for the signals 50B to travel from the jammer 50A to the antennas. Various mathematical algorithms, such as the Extended Kalman Filter (EKF), Unscented Kalman Filter (UKF), the MUSIC protocol and/or PI-CIDF, may be used to process the jammer data and estimate the projectile's 2 attitude accurately. The determined projectile 2 attitude can then be used as feedback to the projectile's control system. It allows the projectile 2 to make necessary adjustments in its flight path to reach its intended target accurately. For example, if the projectile's 2 attitude needs correction to maintain a stable flight, control surfaces like fins, wings 13 or thrusters can be adjusted accordingly. The attitude determination process is typically performed continuously throughout the projectile's 2 flight or path of travel to ensure accurate and real-time information for guidance and control.

The projectile 2 can communicate back to the launcher 1, platform 12, a base station or other missiles and provide the location of the GPS jammer 50A. Ordinarily, the POI 50 where jammer 50A is located often includes other high value targets such as adversarial tanks, communications systems, or other adversary's countermeasures. Towards this end, there may be other structures at POI 50 that may need to be disabled by other projectiles. As such, when the seeker determines the location of the jammer 50A, the guidance kit 6 can also trigger a synthetic-aperture radar (SAR) radar map to be created on the ground around the jammer 50A at the POI 50. The SAR radar map could be analyzed, evaluated, or otherwise discriminated to enable the projectile to steer towards another object at the POI 50 different from the jammer 50A.

For example, as shown in FIG. 1B, the projectile 2 may be moving along its trajectory in response to signal 50B from jammer 50A at POI 50. The kit 6 or other logic on projectile 2 can instruct projectile 2 or another radar system to generate a SAR radar map of the area surrounding the POI 50, within which the jammer 50A is located. The SAR radar map will be evaluated to see if a target at the POI 50 is a higher priority to disable rather than the jammer 50A itself. Then, if another object or target on the SAR radar map is identified, instructions may be communicated back to projectile 2 to steer its wings 13 or canards to the updated or new higher priority target and then detonate at the higher priority target.

The foregoing generally details the efforts of the present disclosure to provide a guided munition or projectile 2 comprising a RF seeker 7 (or any of the foregoing or subsequent other seeker embodiments that are designated with a reference element number ending in 7 (i.e., 107, 207, 307, 407, or 507)) that receives a jamming signal 50B from the RF or GPS signal jammer 50A and comprising command and control logic, such as guidance kit 6, that receives data from the seeker based on the jamming signal 50B received, and the command and control logic guides the guided munition to the RF or GPS signal jammer 50A, wherein the guided munition is configured to detonate near the RF or GPS signal jammer and thereby disable t the RF or GPS signal jammer. The remainder of the present disclosure details various exemplary embodiments that could be implemented to form the seeker 7 and its antennas. However, other versions of seekers with differing antenna arrangements are entirely possible.

Figure 3A:
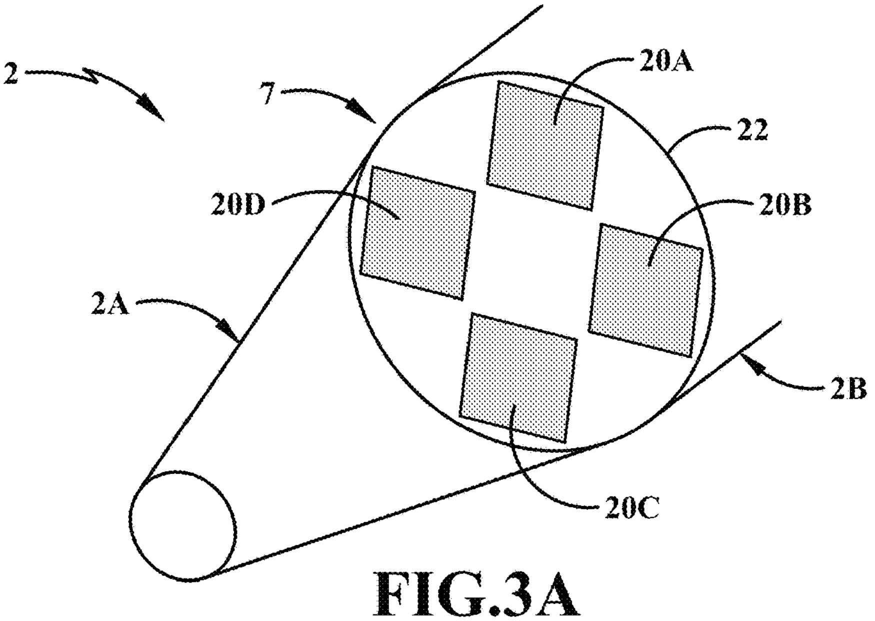
FIG. 3A (FIG. 3A) is a diagrammatic perspective view of one embodiment of an exemplary seeker for the guided munition.

FIG. 3A depicts a scenario in which the seeker 7 is composed of four dual polarization antenna patches behind a dielectric nose cone. This seeker 7 composed of these four antennas could be located on the modular first portion 2A. More particularly, there may be a first dual polarization antenna patch 20A, a second dual polarization antenna patch 20B, a third dual polarization antenna patch 20C, and a fourth dual polarization antenna patch 20D. Each antenna patch 20A-20D may be arranged orthogonally relative to each other and mounted to a baseplate 22 or other structural component on the first modular portion 2A of projectile. Alternatively, baseplate 22 that carries the antennas patches 20A-20D can be on the modular second portion 2B or the modular third portion 2C. At least two of the antenna patches 20A-20D are spaced apart from each other at a distance that is less than one wavelength of signal 50B. The dual-polarized antenna patches are used to capture jamming signals 50B from the RF or GPS signal jammer 50A. The process involves the use of an adaptive method that combines polarization and spatial domain information. In one example, each patch 20A-20D may have two varactor diodes on the ground. By tuning these varactors, continuous two-dimensional beam-steering can be achieved for each of the polarizations. This allows the antenna to effectively mitigate interference signals. In some embodiments, seeker 7 can achieve a reconfigurable pattern when parasitic patches are assigned in H-plane and E-plane respectively. There may be electronically tunable arms which can be in parallel to the antenna polarization direction to control the antenna pattern. The seeker 7 can use the dual-polarized information to suppress interference, thereby enhancing the stability of the seeker 7.

Regardless of the type of antenna patches 20A-20D that are utilized for seeker 7 (or one of the other embodiments of seeker detailed herein), a cross correlation function can be performed on the signals 50B that are received by the antennas that compose the respective seeker 7. For a given antenna or antenna patch, the radiation and pattern of that antenna for seeker 7 will have a known radiation pattern. With the known radiation pattern, those radiation patterns are used to obtain amplitude and phase of the signal 50B. With the amplitude and phase, a DF function or protocol (e.g. CIDF or another) may be implemented to determine the angle of arrival (AoA) of the jammer signal 50B. When there is only a single jammer 50A at the point of interest 50, the antennas composing the seeker 7 will be cross correlated to get the relative phases and amplitudes to perform the direction finding. However, if there are multiple jammers, then a MUSIC protocol or algorithm can be performed to determine the angle of arrival of the multiple jammer signals emanating from respective jammers 50A.

In one particular embodiment, the spacing of the antenna patches 20A-20D on baseplate 22 is less than one-half the wavelength of signal 50B. However, a sufficient angle of arrival is still able to be obtained because this exemplary embodiment of the system integrates the signal over about 20 milliseconds. This results in about less than one degree phase error after cross correlation between channels.

The base or baseplate 22 may be one end of a cone, which may define the first modular portion 2A and may be formed from a dielectric material. The cone can be a solid dielectric material, or the cone could be hollow. When the cone is hollow, the cone acts as a radome. Further, instead of utilizing four dual polarization patch antennas, it is possible to utilize a quad-ridge cone antenna or multiple quad-ridge cone antennas. In other embodiments, any type of dual polarization antenna could be utilized.

Figure 3B:
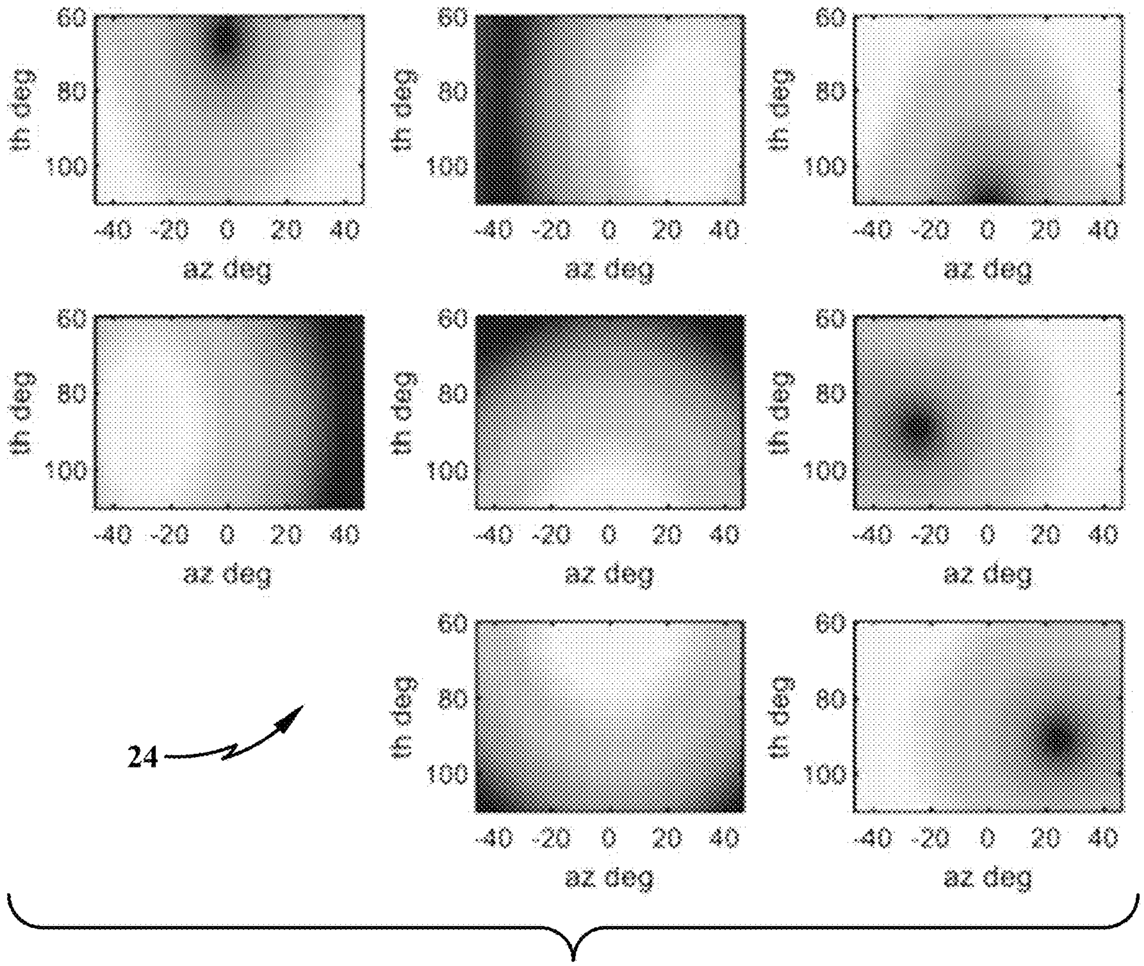
FIG. 3B (FIG. 3B) is a set of exemplary radiation patterns corresponding to the exemplary seeker of FIG. 3A.

As depicted in FIG. 3B the antenna radiation patterns 24 are depicted for patches 20A-20D that can be utilized for the Multiple Signal Classification (MUSIC) protocols. The antenna patches 20A-20D provide voltages in response to receiving the signal 50B. More particularly, a strain voltage exhibited across each one of the antenna patches in seeker 7 in response to reception of signal 50B. In this embodiment, each of the patches generates two channels because each patch is a dual polarization patch. Thus, there are two channels at or behind each patch; hence eight patterns are shown in FIG. 3B (two for each respective antenna patch 20A-20D). The two channels are for the two orthogonal polarizations, namely, vertical polarization and horizontal polarization. Operatively, the antenna patches 20A-20D operate and collect signal 50B data for a period of time. In one particular embodiment, the period of time may be about 20 milliseconds. The sample rate for this collection may be approximately 5 megahertz. Then, the resulting voltages are cross correlated with the other patches that comprise the seeker 7. The cross correlation results in a scalar value result. This results in the determination of the relative phase of signal 50B between each respective patch. From the relative phase, a direction finding algorithm may be applied to determine the angle of arrival of signal 50B. This angle of arrival may then be provided to the guidance tracker kit 6, and more particularly the command to control logic which can be utilized to guide the munition or projectile 2 towards the point of interest 50, and more particularly toward the RF or GPS signal jammer 50A.

The cross-correlation function may be used in conjunction with the MUSIC algorithm to estimate the direction of arrival (DOA) of signals received at the antenna patches. The cross correlation of the stream of GPS signals can be performed in a field programmable gate array (FPGA), graphical processing unit (GPU), or computer processing unit (CPU), depending on the processing speed. The MUSIC algorithm decomposes each polarization signal into two orthogonal polarization components. These are considered to be a pair of coherent signals coming from the same direction but with different polarization. An autocorrelation matrix of the signal may be estimated using a sample correlation matrix. The MUSIC protocol may estimate the frequency content of the signal or autocorrelation matrix using an Eigen space method or another similar method. If the autocorrelation matrix is a Hermitian matrix, then all of its Eigen vectors are orthogonal to each other. The cross-correlation function may measure the similarity of two series as a function of the displacement of one relative to the other. In this context, it can compare the decomposed signals from the MUSIC algorithm with known signal patterns or antenna radiation patterns 24. This comparison allows for the estimation of the DOA of signal 50B. In another particular embodiment, the method of determining the angle of arrival is accomplished by utilizing the cross correlation result, which is a complex scalar number, and use that result as input to a lookup table with radiation patterns 24. The complex scalar result is then compared with the cross correlated scalar complex voltages in the lookup table to obtain an angle.

Thus, the DOA and polarization parameters can be estimated by applying the cross-correlation function to the results of the MUSIC algorithm. This involves using the decomposed signals and their decoupled information to determine where the signal is coming from and its polarization. The angles of incident direction may be re-estimated, which may improve the accuracy of DOA estimation of signal 50B.

Once the angle of arrival or DOA is obtained, it is provided to command and control logic or guidance kit 6 to guide the projectile 2 towards the point of interest 50 or the RF or GPS signal jammer 50A. The angle of arrival may be continuously updated as the projectile 2 moves towards the point of interest 50. In one embodiment the update rate may occur continuously at a rate of about 50 hertz.

Figure 4A:
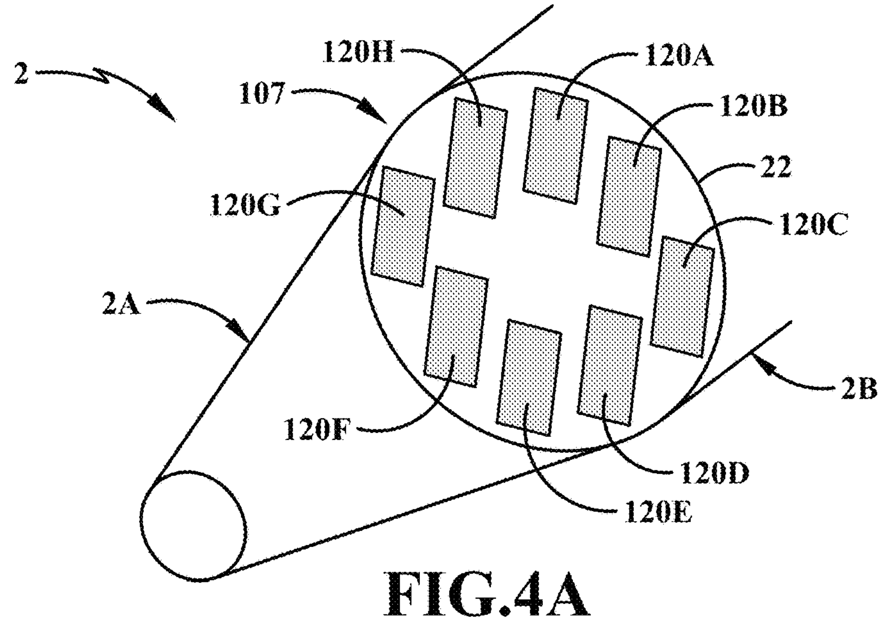
FIG. 4A (FIG. 4A) is a diagrammatic perspective view of another embodiment of an exemplary seeker for the guided munition.

FIG. 4A depicts another exemplary seeker 107 that has a dielectric cone with baseplate 22 carrying utilizing eight linear patches behind the cone. Namely, a first linear antenna patch 120A, a second linear antenna patch 120B, a third linear antenna patch 120C, a fourth linear antenna patch 120D, a fifth linear antenna patch 120E, a sixth linear antenna patch 120F, a seventh linear antenna patch 120G and an eighth linear antenna patch 120H. Each respective patch 120A-120H has a linear polarization, either vertical or horizontal.

When the antennas are at the GPS frequency, which is about 1.57 gigahertz, the signal 50B has a wavelength of about eight inches. This requires the eight linear patches 120A-120H of FIG. 4A to be spaced on the base 22, however the base typically has a diameter of in range from about 2.75 inches to about 4 inches. Thus, the cross correlation techniques must be applied given the physical space constraints.

Figure 4B:
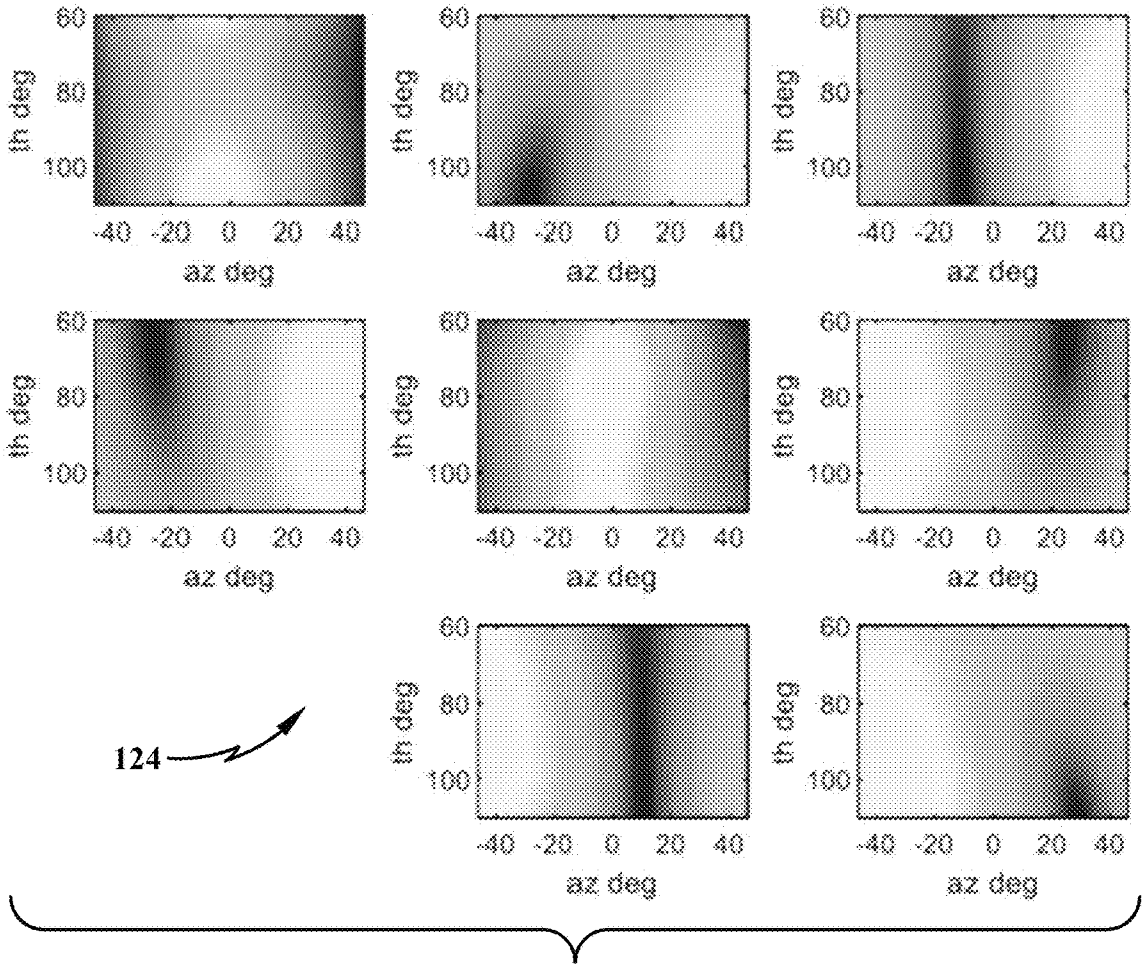
FIG. 4B (FIG. 4B) is a set of exemplary radiation patterns corresponding to the exemplary seeker of FIG. 4A.

FIG. 4B depicts the antenna radiation patterns 124 from the antenna patches 120A-120H. The radiation patterns 124 can be utilized to perform the cross correlation functions to establish a DF result of the signal 50B as previously detailed in the discussion pertaining to FIG. 3B.

Notably, for the embodiments of seeker 7 and seeker 107, a dielectric cone having base 22 helps the phase gradient versus polar angle. Additionally, the dielectric cone helps the DF accuracy. The cone could make each antenna of each seeker have a steeper phase gradient with angle off the nose. As such, each antenna is rolling off in gain differently and providing a faster phase rate of change versus angle compared to free space. In one particular embodiment, the radiation patterns including the dielectric cone effects should be designed to peak about 10 degrees off the nose of the cone so that the phase change versus polar angle can be rapid around the field of regard for homing, within 10 degrees of the nose. However, not all cone lengths and dielectric constants will provide this optimum pattern. For GPS frequency (1.575 GHz), a cone with length 150 mm and a base 22 diameter between about 2.75 to 3 inches, and a dielectric constant of alumina (er=9.2) does provide this preferred, but not required, pattern.

Figure 5:
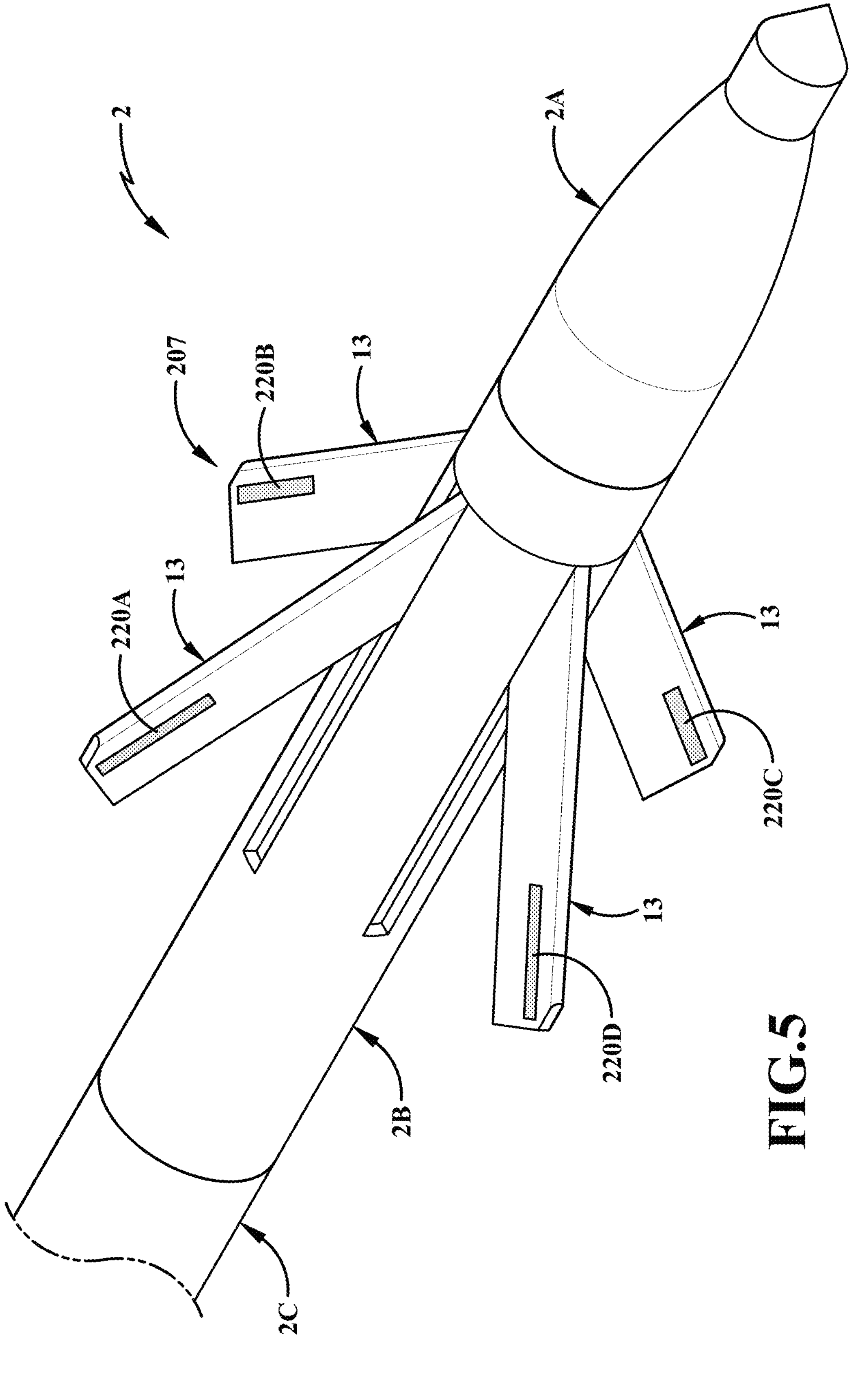
FIG. 5 (FIG. 5) is a diagrammatic perspective view of another exemplary seeker located on canards of the guided munition.

FIG. 5 depicts a scenario where another embodiment of a seeker 207 includes antennas 220A, 220B, 220C, and 220D are installed on the canards or wings 13 in the modular second portion 2B of projectile 2. The antennas 220A, 220B, 220C, and 220D may be any type of antenna. In one embodiment, each antenna 220A, 220B, 220C, and 220D may be located at or near the leading edge relative to the direction of travel, of each wing 13. This may be advantageous as the spacing between each respective antenna element is greater than that which was shown in FIG. 3A and FIG. 4A. Thus, the configuration of seeker 207 has a wider electrical baseline than seeker 7 or seeker 107. With a wider baseline, when the seeker 207 is experiencing noise, the guidance kit 6 is able to provide a more accurate angle of arrival because the error between the respective antenna 220A, 220B, 220C, and 220D elements is lessened. This is because the rate of change relative to the infinite angle is very quick when there is a wide diameter direction finding array. Stated otherwise, the larger the direction finding array is, the more sensitive the system is to small changes. Thus, small changes in phase will correspond to more accurate angle determination. In one embodiment, the canards can be a screw-on application located in front of the control wings. For the least impact on trajectory, the canards could be 'wind cocking' to avoid unwanted sideways steering drag. In general, a long DF baseline will provide tighter bearing accuracy.

Figure 6A:
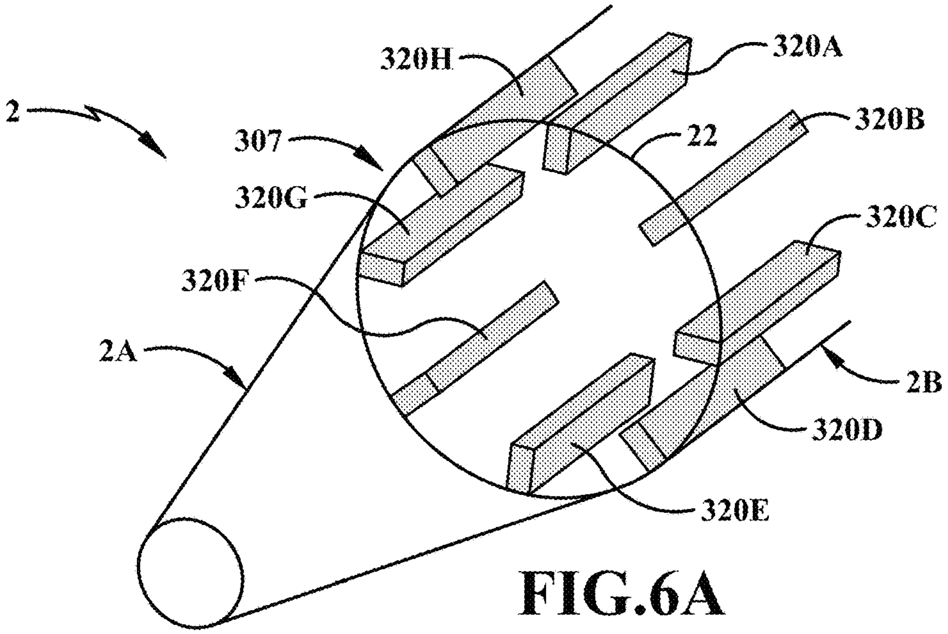
FIG. 6A (FIG. 6A) is a diagrammatic perspective view of another embodiment of an exemplary seeker for the guided munition.

FIG. 6A depicts another exemplary seeker 307 that has a dielectric cone with baseplate 22. Adjacent to the baseplate 22, the seeker 307 comprises a plurality of loop antennas located at the forward end of the modular second portion 2B. Namely, a first loop antenna 320A, a second loop antenna 320B, a third loop antenna 320C, a fourth loop antenna 320D, a fifth loop antenna 320E, a sixth loop antenna 320F, a seventh loop antenna 320G and an eighth loop antenna 320H. However, the plurality of loop antennas 320A-320H could be located at the rear end of the modular first portion 2A. In this embodiment, the eight loop antennas 320A-320H radiate to detect signal 50B generated from the GPS jammer 50A. In one exemplary embodiment, one of, some of, or all of the loop antenna 320A-320H may be any traveling wave antenna. More particularly, the loop antennas may be any loop resonant antenna that is less than a half wavelength long configured to receive signal 50B.

Figure 6B:
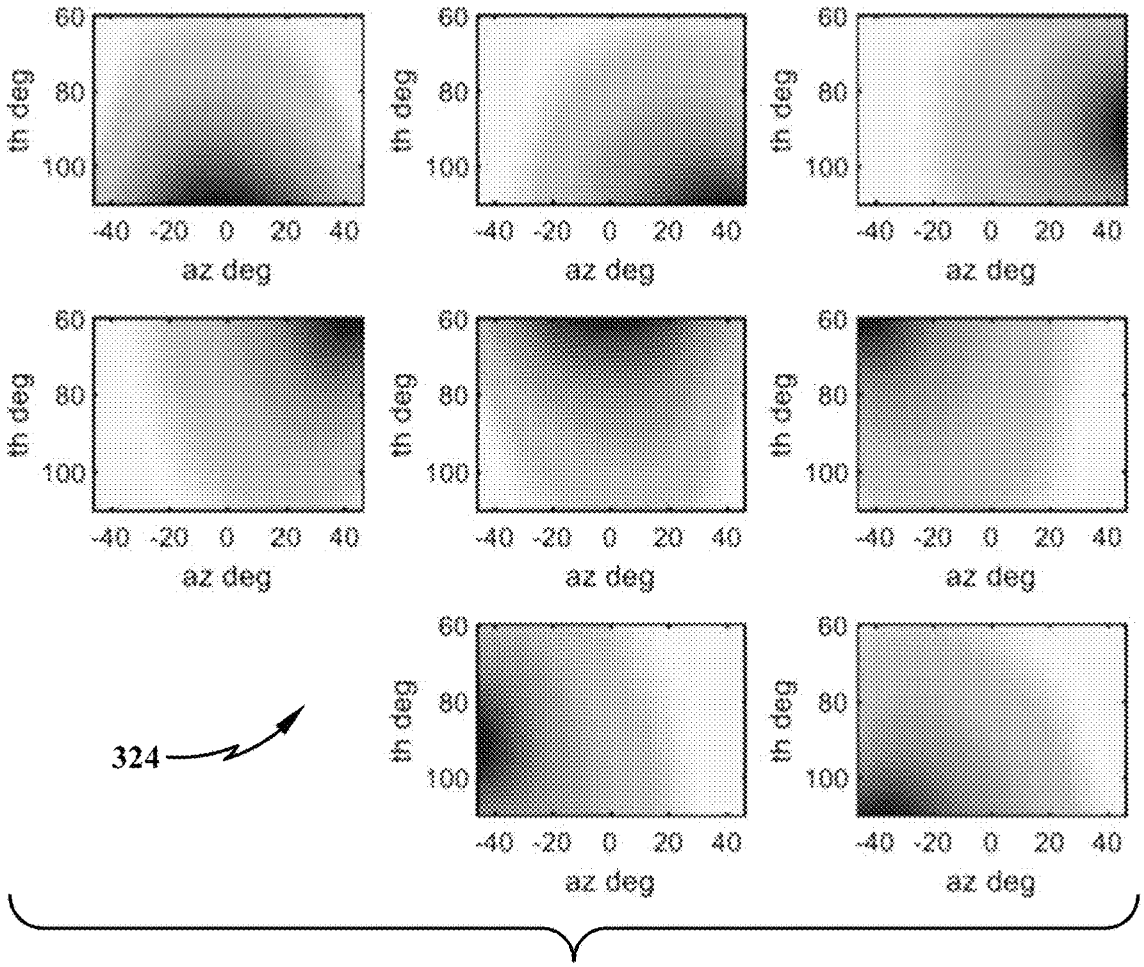
FIG. 6B (FIG. 6B) is a set of exemplary radiation patterns corresponding to the exemplary seeker of FIG. 6A.

FIG. 6B depicts the antenna radiation patterns 324 from the loop antenna 320A-320H. The radiation patterns 324 can be utilized to perform the cross correlation functions to establish a DF result of the signal 50B as previously detailed in the discussion pertaining to FIG. 3B.

Figure 7A:
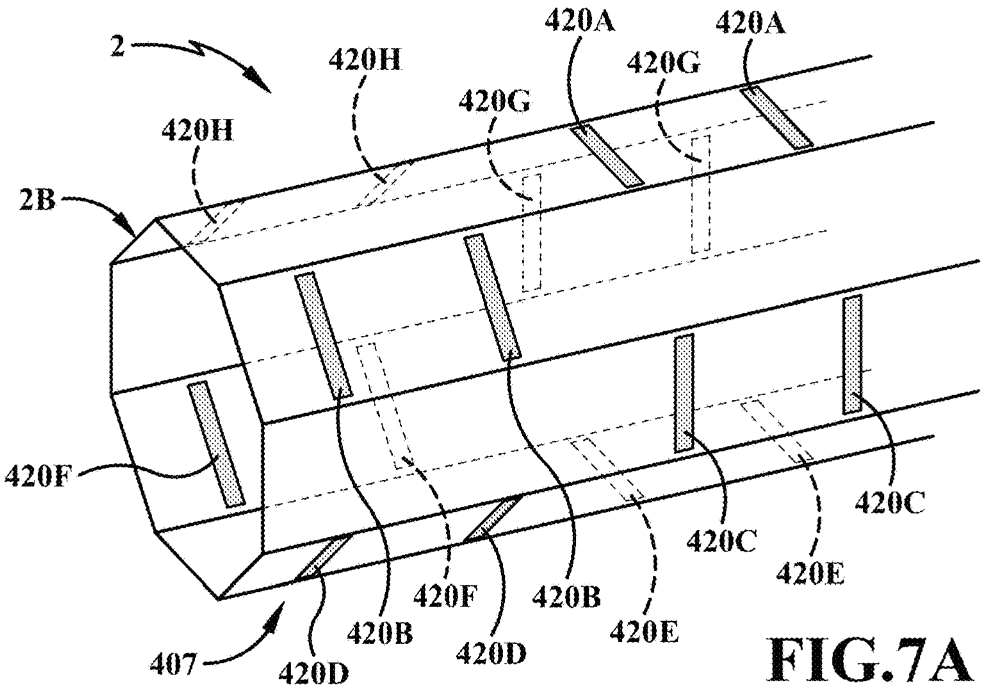
FIG. 7A (FIG. 7A) is a diagrammatic perspective view of another embodiment of an exemplary seeker for the guided munition.

FIG. 7A depicts another exemplary seeker 407. The seeker 407 comprises a plurality of slot antennas located in contoured slots formed around the body of either the modular first portion 2A or the modular second portion 2B. Alternatively, the slots may be dispose internal to a radome on either the modular first portion 2A or the modular second portion 2B. Namely, a first slot antenna 420A, a second slot antenna 420B, a third slot antenna 420C, a fourth slot antenna 420D, a fifth slot antenna 420E, a sixth slot antenna 420F, a seventh slot antenna 420G and an eighth slot antenna 420H. However, the plurality of slot antennas 420A-420H could be located at the rear end of the modular first portion 2A. In this embodiment, the eight slot antenna 420A-420H radiate to detect signal 50B generated from the GPS jammer 50A.

With continued reference to FIG. 7A, the slots may be formed in the ground plane that defines the outer perimeter or outer mode line of the contour shape of the body portion of either the modular first portion 2A or the modular second portion 2B. Alternatively, the slot antennas could be notch antennas. The projectile 2 roll angle can be rolled so that the presences of signal 50B is received or otherwise present at all the antennas 420A-420H.

Figure 7B:
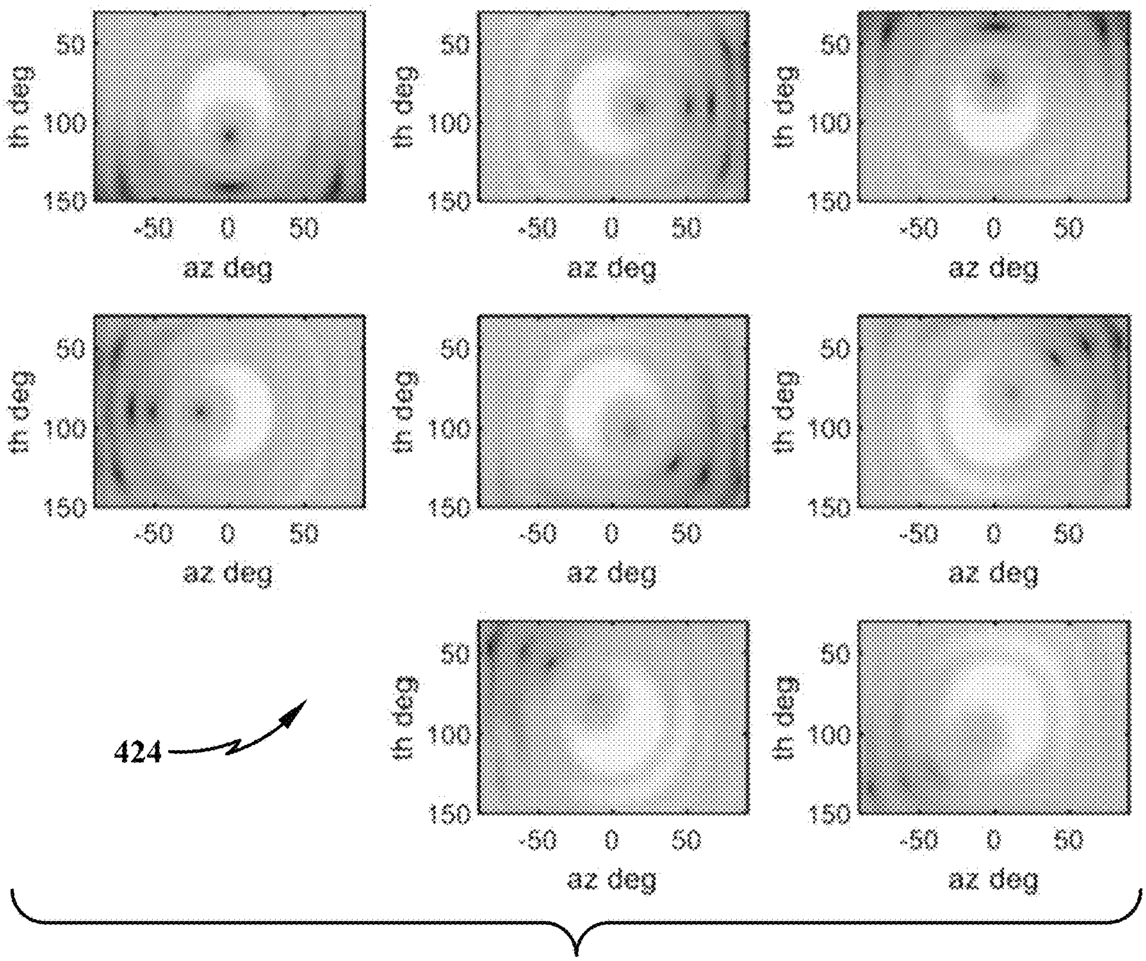
FIG. 7B (FIG. 7B) is a set of exemplary radiation patterns corresponding to the exemplary seeker of FIG. 7A.

FIG. 7B depicts the antenna radiation patterns 424 from the slot antenna 420A-420H. The radiation patterns 424 can be utilized to perform the cross correlation functions to establish a DF result of the signal 50B as previously detailed in the discussion pertaining to FIG. 3B.

Figure 8:
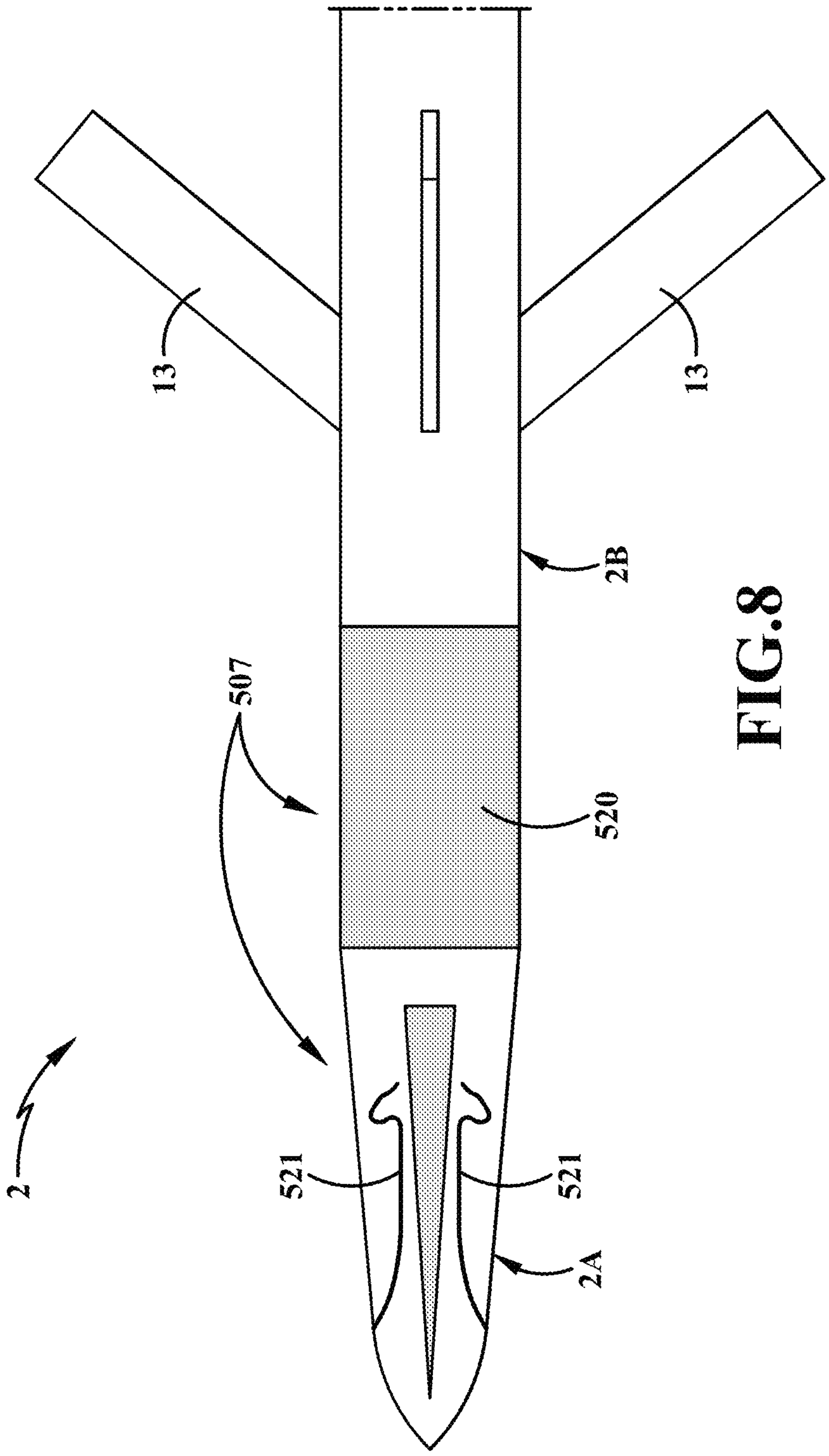
FIG. 8 (FIG. 8) is a diagrammatic perspective view of another exemplary seeker located on canards of the guided munition.

FIG. 8 depict a broadband antenna to form a seeker 507. Utilizing a broadband antenna 520 would allow the projectile 2 to detect other signals and not just the GPS jamming signal 50B referenced herein. If broadband notches 521 of the front of the projectile 2 is utilized, then the projectile 2 can detect and home to other jamming technologies. For example, if there is an X-band jammer, then the projectile will be able to home into that jammer. In this embodiment, there would be eight broadband notches formed under a radome near the front end of the modular first portion 2A.

As shown by the many different embodiments detailed herein, any version of the seeker that is part of the jammer signal guidance kit 6 may include or be composed of a plurality of antennas configured to detect jammer signal 50B emanating or broadcasting from the RF or GPS signal jammer 50A that is the POI 50 that projectile 2 needs to eliminate. Further, any of these antennas can be located on either the modular first portion 2A, the modular second portion 2B, or the modular third portion 2C of projectile 2.

In another embodiment of the present disclosure, the projectile 2 or system 10 can be utilized to destroy a plurality of RF signal jammers 50A located around or near a POI 50. The RF seeker on the projectile 2 can detect the multiple signal emitters (i.e., two or more signal jammers 50A). Then, the command and control logic may include centroiding protocol. The command and control logic may determine a centroid based on the munition blast radius and the relative distances of the multiple signal jammers. This centroid represents the aimpoint for projectile 2 that needed to inflict maximum damage to the two or more RF signal emitters as a whole. A filtering protocol can be utilized to filter out any RF signal emitters that may be located outside of the known blast radius of the projectile 2.

Although the signal jammer 50A has been primarily discussed with respect the GPS signal 50B (which necessarily operates in the GPS band), the signal jammer could also operate in other bandwidths. For example, another embodiment of signal 50B could be generated by a signal jammer that is operating in the S-band, such that a signal generator would be a S-band radar. Still further, other embodiments can provide a system or munition that can home in on communication signals, not jammers. In each instance, the present disclosure should desire this system to be low cost and modular. Thus, if embodiments of the present disclosure are targeting a communication signal at a different carrier frequency, then the munition could receive (i.e., screw in) a different RF front end and different tunned antennas. Further, the present disclosure can use more broad band antennas and just select the RF band using a tuned local oscillator in the front end. Additionally and in an effort to reduce cost, a CPU can be used if the bandwidth or sample rate is low enough.

The projectile 2 or system 10 of the present disclosure may additionally include one or more sensors to sense or gather data pertaining to the surrounding environment or operation of the projectile 2 or system 10. Some exemplary sensors capable of being electronically coupled with the projectile 2 or system 10 of the present disclosure (either directly connected to the projectile 2 or system 10 of the present disclosure or remotely connected thereto) may include but are not limited to: accelerometers sensing accelerations experienced during rotation, translation, velocity/speed, location traveled, elevation gained; gyroscopes sensing movements during angular orientation and/or rotation, and rotation; altimeters sensing barometric pressure, altitude change, terrain climbed, local pressure changes, submersion in liquid; impellers measuring the amount of fluid passing thereby; Global Positioning sensors sensing location, elevation, distance traveled, velocity/speed; audio sensors sensing local environmental sound levels, or voice detection; Photo/Light sensors sensing ambient light intensity, ambient, Day/night, UV exposure; TV/IR sensors sensing light wavelength; Temperature sensors sensing machine or motor temperature, ambient air temperature, and environmental temperature; and Moisture Sensors sensing surrounding moisture levels.

The projectile 2 or system 10 of the present disclosure may include wireless communication logic coupled to sensors on the projectile 2 or system 10. The sensors gather data and provide the data to the wireless communication logic. Then, the wireless communication logic may transmit the data gathered from the sensors to a remote device. Thus, the wireless communication logic may be part of a broader communication system, in which one or several devices, assemblies, or systems of the present disclosure may be networked together to report alerts and, more generally, to be accessed and controlled remotely. Depending on the types of transceivers installed in the projectile 2 or system 10 of the present disclosure, the system may use a variety of protocols (e.g., Wi-Fi®, ZigBee®, MIWI, BLUETOOTH®) for communication. In one example, each of the devices, assemblies, or systems of the present disclosure may have its own IP address and may communicate directly with a router or gateway. This would typically be the case if the communication protocol is Wi-Fi®. (Wi-Fi® is a registered trademark of Wi-Fi Alliance of Austin, TX, USA; ZigBee® is a registered trademark of ZigBee Alliance of Davis, CA, USA; and BLUETOOTH® is a registered trademark of Bluetooth Sig, Inc. of Kirkland, WA, USA).

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. As such, one aspect or embodiment of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under", or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A guided munition comprising:

a modular first portion located at a front end of a guided munition;

a modular second portion located rearward of the modular first portion, wherein the modular second portion selectively connects with the modular first portion;

a radio frequency (RF) seeker that receives a signal from a signal jammer, wherein the RF seeker has at least two antennas that are spaced apart from each other at a distance that is less than one wavelength of the signal that is to be detected by the RF seeker; and command and control logic that receives data from the RF seeker based on the signal received at the RF seeker, and the command and control logic guides the guided munition to the signal jammer, wherein the guided munition is configured to detonate near the signal jammer and thereby disable the signal jammer.

2. The guided munition of claim 1, wherein the RF seeker is located on one of the modular first portion and the modular second portion.

3. The guided munition of claim 1, wherein the RF seeker comprises:

a plurality of dual polarization antennas located on one of the modular first portion and the modular second portion.

4. The guided munition of claim 1, wherein the RF seeker comprises:

a plurality of linear patch antennas located on one of the modular first portion and the modular second portion.

5. The guided munition of claim 1, wherein the command and control logic performs at least one of (1) cross correlation and (2) multiple signal classification (MUSIC) of the data from the seeker to obtain relative phase and amplitude of the signal.

6. The guided munition of claim 5, wherein the command and control logic direction finds a location of the signal jammer based on the relative phase and amplitude of the signal.

7. The guided munition of claim 6, further comprising:

a lookup table, wherein the command and control logic direction finds a location of the signal jammer based on relative phase and amplitudes contained in the lookup table.

8. The guided munition of claim 1, wherein the command and control logic is provided with a roll, pitch, and yaw of the guided munition, and the command and control logic instructs the guided munition to move and position the roll at an orientation such that all antennas that compose the seeker receive at least some of the signal and none of the antennas are in an exact cross polarization relative to each other.

9. The guided munition of claim 1, wherein the signal has a bandwidth that is in a range from about 11 MHz to about 15.5 MHz.

10. The guided munition of claim 1, wherein the signal has a wavelength that is in a range from about 4 inches to about 12 inches.

11. A modular radio frequency (RF) seeker for selective connection with a projectile, the modular RF seeker comprising:

a plurality of RF antennas, wherein at least two RF antennas are spaced apart from each other at a distance that is less than one wavelength of a signal band of interest that is to be detected by the modular RF seeker; and a modular connector that modularly connects with another portion of the projectile, wherein when modularly connected, the plurality of RF antennas are in operative communication with a guidance kit on the projectile that guides the projectile toward at least one signal jammer emitting a signal at the signal band of interest.

12. The modular RF seeker of claim 11, wherein the guidance kit includes command and control logic to cross correlate data received from the RF seeker to obtain relative phase and amplitude of the signal and direction finding a location of the at least one signal jammer based on a relative phase and amplitude of the signal.

13. A method comprising:

installing a radio frequency (RF) seeker on a guided munition, wherein the RF seeker receives a signal from a signal jammer, wherein the RF seeker has at least two antennas that are spaced apart from each other at a distance that is less than one wavelength of the signal that is to be detected by the RF seeker; and installing command and control logic on the seeker, wherein the command and control logic receives data from the RF seeker based on the signal received at the RF seeker, wherein the command and control logic guides the guided munition to the signal jammer, wherein the guided munition is configured to detonate near the signal jammer and thereby disable the signal jammer.

14. The method of claim 13, wherein after the RF seeker has been installed on the guided munition, the RF seeker receives the signal emanating from the signal jammer located at or near a point of interest (POI); and wherein after the command and control logic has been installed on the guided munition, the command and control logic alters a trajectory of the guided munition in response to receiving the jamming signal and directs the trajectory of the guided munition toward the signal jammer.

15. The method of claim 14, wherein after the command and control logic has been installed on the guided munition, the command and control logic correlates data from the RF seeker to obtain relative phase and amplitude of the signal.

16. The method of claim 15, f wherein after the command and control logic has been installed on the guided munition, the command and control logic direction finds a location of the signal jammer based on the relative phase and amplitude of the signal.

17. The method of claim 16, wherein after the command and control logic has been installed on the guided munition, the command and control logic compares the relative phase and amplitude of the signal to values in a look up table, wherein the command and control logic direction finds a location of the signal jammer based on relative phase and amplitudes contained in the lookup table.

18. The method of claim 13, wherein after the RF seeker has been installed on the guided munition, the guided munition positions at least one of roll, pitch and yaw at an orientation such that all antennas that compose the seeker receive at least some of the signal and none of the antennas are in an exact cross polarization relative to each other.

19. The method of claim 13, wherein the signal has a bandwidth that is in a range from about 11 MHz to about 15.5 MHz.

20. The method of claim 13, wherein the signal has a wavelength that is in a range from about 4 inches to about 12 inches.

* * * * *